United States Patent
Yamamoto et al.

(10) Patent No.: US 11,325,547 B2
(45) Date of Patent: May 10, 2022

(54) WIRE HARNESS ROUTING APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/054,732

(22) PCT Filed: May 14, 2019

(86) PCT No.: PCT/JP2019/019048
§ 371 (c)(1),
(2) Date: Nov. 11, 2020

(87) PCT Pub. No.: WO2019/225391
PCT Pub. Date: Nov. 28, 2019

(65) Prior Publication Data
US 2021/0245683 A1    Aug. 12, 2021

(30) Foreign Application Priority Data
May 25, 2018  (JP) .............................. JP2018-100604

(51) Int. Cl.
*B60R 16/027*    (2006.01)
*B60N 2/14*    (2006.01)
(Continued)

(52) U.S. Cl.
CPC .............. *B60R 16/027* (2013.01); *B60N 2/14* (2013.01); *B60R 16/0215* (2013.01); *H02G 11/00* (2013.01)

(58) Field of Classification Search
CPC . B60N 2/90; B60N 2/14; B60R 16/02; H02G 11/00
(Continued)

(56) References Cited

U.S. PATENT DOCUMENTS

| 4,542,858 A | * | 9/1985 | Manges | ............... B25J 19/0029 174/86 |
| 7,207,833 B2 | * | 4/2007 | Jeong | .................... B60R 16/027 439/501 |
| 2013/0270399 A1 | * | 10/2013 | Berkowitz | ........... B25J 19/0029 248/70 |

FOREIGN PATENT DOCUMENTS

| JP | H01-101123 U | 7/1989 |
| JP | 2010-214529 A | 9/2010 |

(Continued)

OTHER PUBLICATIONS

International Search Report dated Jun. 18, 2019 for WO 2019/225391 A1 (3 pages).

*Primary Examiner* — Timothy J Thompson
*Assistant Examiner* — Michael F McAllister
(74) *Attorney, Agent, or Firm* — Abelman, Frayne & Schwab

(57) ABSTRACT

A wire harness routing apparatus disclosed by the present specification is a wire harness routing apparatus (10) that is to be attached to a rotation platform (80) that allows a seat (S) to be rotated with respect to a base portion (90) provided in a vehicle, the wire harness routing apparatus (10) including a wire harness (20) that is arranged between the seat (S) and the base portion (90), and a case (40) that rotates accompanying the rotation of the seat (S) in a state of (Continued)

accommodating the wire harness (20), wherein the case (40) is arranged on the inner side in the radial direction of the rotation platform (80) using the rotation axis of the rotation platform (80) as a reference.

7 Claims, 32 Drawing Sheets

(51) Int. Cl.
     *H02G 11/00*      (2006.01)
     *B60R 16/02*      (2006.01)

(58) Field of Classification Search
     USPC .................................................... 174/72 A
     See application file for complete search history.

(56) References Cited

FOREIGN PATENT DOCUMENTS

| | | |
|---|---|---|
| JP | 6052148 B2 | 12/2016 |
| JP | 2017-210125 A | 11/2017 |

\* cited by examiner

WIRE HARNESS ROUTING APPARATUS

CROSS REFERENCE TO RELATED APPLICATIONS

This application is a national phase of PCT application No. PCT/JP2019/019048, filed on 14 May 2019, which claims priority from Japanese patent application No. 2018-100604, filed on 25 May 2018, all of which are incorporated herein by reference.

TECHNICAL FIELD

The technique disclosed by the present specification relates to a wire harness routing apparatus.

BACKGROUND

For example, the wire harness routing apparatus disclosed in Japanese Patent No. 6052148 (hereinafter referred to as "Patent Document 1") is known as a wire harness routing apparatus for supplying power to a rotatable seat mounted in a vehicle such as an automobile. The wire harness routing apparatus includes a rotation absorption case that is fixed to a bottom surface of the seat, separate from a rotation mechanism provided on the bottom surface of the seat. The rotation absorption case is provided with a circular arc-shaped slide groove on which a slider can be moved in a circular arc shape, and if the seat is to be rotated, the rotation absorption case rotates according to the rotation of the seat, the wire harness is caused to follow the rotation of the seat due to the slider sliding in the circular arc-shaped slide groove, and the excess length of the wire harness is accommodated by diverting the excess length of the wire harness in the rotation absorption case.

PRIOR ART DOCUMENT

Patent Document

Patent Document 1: JP 6052148B

SUMMARY OF THE INVENTION

Problems to be Solved

In view of this, the above-described wire harness routing apparatus is provided on the bottom surface of the seat, separate from the rotation mechanism, and therefore if the space between the seat and the bottom portion of the vehicle is limited, there is a risk that the wire harness routing apparatus will no longer be able to be installed. Furthermore, for example, if the rotation angle of the seat is increased, although the excess length of the wire harness increases, the rotation absorption case cannot be increased in size, and the wire harness cannot be accommodated in the rotation absorption case.

The present specification discloses a technique for accommodating a wire harness in a limited space.

Means to Solve the Problem

The technique disclosed by the present specification is a wire harness routing apparatus configured to be attached to a rotation mechanism that allows a seat to be rotated with respect to a base portion provided in a vehicle, the wire harness routing apparatus including: a wire harness that is arranged between the seat and the base portion; and a case configured to rotate accompanying rotation of the seat in a state of accommodating the wire harness. The case is arranged on an inner side in a radial direction of the rotation mechanism using a rotational axis of the rotation mechanism as a reference.

According to this kind of wire harness routing apparatus, the case is arranged on the inner side in the radial direction of the rotation mechanism, which is dead space in the rotation mechanism, and therefore even if the space between the base portion to which the seat is fixed via the rotation mechanism and the floor portion of the vehicle is limited, the wire harness routing apparatus accommodating the wire harness can be installed without using the space between the base portion and the bottom portion of the vehicle.

The wire harness routing apparatus disclosed by the present specification may also have the following configurations.

It is also possible to use a configuration in which the rotation mechanism includes a base-side pedestal that is fixed to the base portion, and a ring-shaped seat-side pedestal that is fixed to the seat and allows the seat to be rotated due to being rotatably supported on the base-side pedestal, and the case is formed into a circular shape so as to extend along an inner peripheral surface of the seat-side pedestal.

According to this kind of configuration, the case can be arranged on the entire inner side of the seat-side pedestal, and therefore, for example, the wire harness that can be accommodated in the case can be made longer compared to a case where a case with a rectangular shape or a small circular shape is arranged. That is, this kind of configuration is effective even when the rotation range of the seat is large and the wire harness is longer.

It is also possible to use a configuration including a base-side fixing member that is fixed to the base portion in a state of holding an end portion on the base portion side of the wire harness pulled out from the case toward the base portion, and that is configured to rotate relative to the case accompanying rotation of the seat. The case includes a gap that is formed along a side wall of the case, and through which the base-side fixing member is inserted, and a side wall of the case is provided with a harness reception portion that is provided protruding inward in a radial direction and receives the wire harness when the wire harness is arranged along the side wall.

According to this kind of configuration, for example, the harness reception portion supports the wire harness from below when the wire harness is arranged on the inner side of the side wall of the case due to the reaction force of the wire harness or the like, and therefore it is possible to prevent the wire harness from being pulled out from the gap to the outside of the case.

It is also possible to use a configuration including a base-side fixing member that is fixed to the base portion in a state of holding an end portion on the base portion side of the wire harness pulled out from the case toward the base portion, and that is configured to rotate relative to the case accompanying rotation of the seat, in which the case includes a gap that is formed along a side wall of the case, and through which the base-side fixing member is inserted, and a side wall of the case is provided with a harness reception portion that is provided protruding inward in a radial direction and receives the wire harness when the wire harness is arranged along the side wall.

According to this kind of configuration, the case can be rotated while positioning the positions of the end portion on the sheet side of the wire harness and the end portion on the base side. Then, when the seat is rotated in one direction, the wire harness is wrapped around the seat-side fixing portion, and when the seat is rotated in another direction, which is the direction opposite to the one direction, the wire harness that was wrapped around the seat-side fixing portion is unwrapped, and can be arranged in a state of surrounding the seat-side fixing portion once.

That is, even if the case is rotated in a wide range (e.g., a 360-degree range) according to the seat, the excess length of the longer wire harness can be accommodated in the case.

It is also possible to use a configuration in which the seat-side fixing portion includes a rounded overhang portion at which the wire harness is arranged loosely along a wrapping center side of the wire harness when the wire harness is wrapped.

According to this kind of configuration, it is possible to suppress excess bending of the wire harness at the wrapping center of the wire harness wrapped around the seat-side fixing portion, and the wire harness can be prevented from breaking.

It is also possible to use a configuration in which the wire harness is constituted by including an outer covering body that can elastically deform, a wire that is inserted through the outer covering body, and an elastic wire material that is inserted through the outer covering body together with the wire and causes the outer covering body to loosely curve.

According to this kind of configuration, since a state is entered in which the outer covering body is loosely curved due to the elastic wire material, it is possible to prevent a case in which the rotation of the case is hampered due to the wire harness being tangled in the case.

It is also possible to use a configuration in which the wire harness is constituted by including an outer covering body that restricts bending in a direction different from a wrapping direction, and a wire that is inserted through the outer covering body and moves in the case together with the outer covering body.

According to this kind of configuration, when the case is rotated in the other direction to unwrap the wrapped wire harness, the outer covering body of the wire harness is restricted from bending in a direction other than the wrapping direction, and therefore it is possible to prevent a case in which the rotation of the case is hampered due to the wire harness being tangled in the case.

Effect of the Invention

According to the technique disclosed by the present specification, it is possible to accommodate the wire harness in a limited space.

DETAILED DESCRIPTION TO EXECUTE THE INVENTION

First Embodiment

A first embodiment of the technique disclosed in the present specification will be described with reference to FIGS. 1 to 25.

Figure 11:
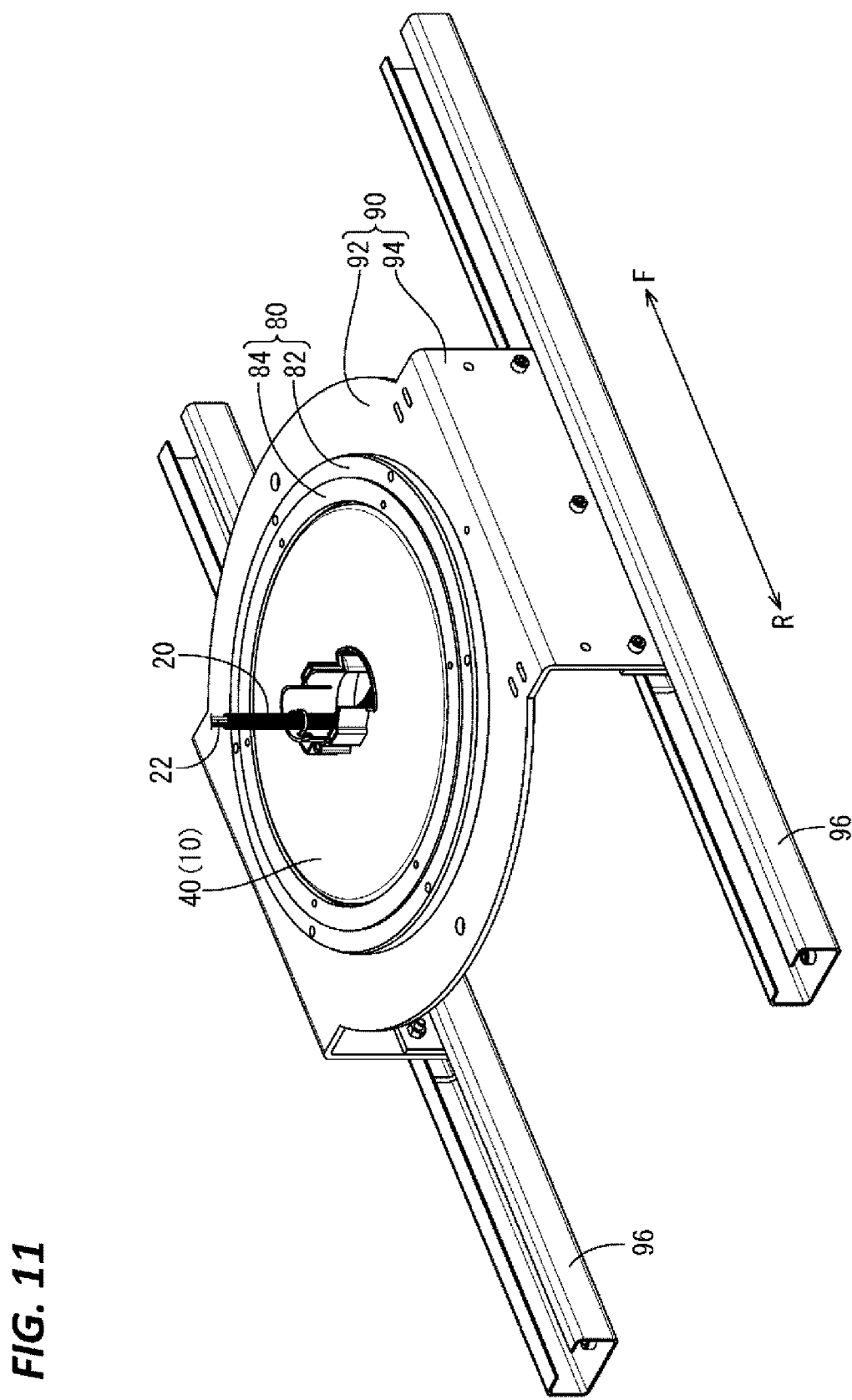
FIG. 11 is a perspective view showing a state in which the wire harness routing apparatus is attached to the rotation platform.
Figure 12:
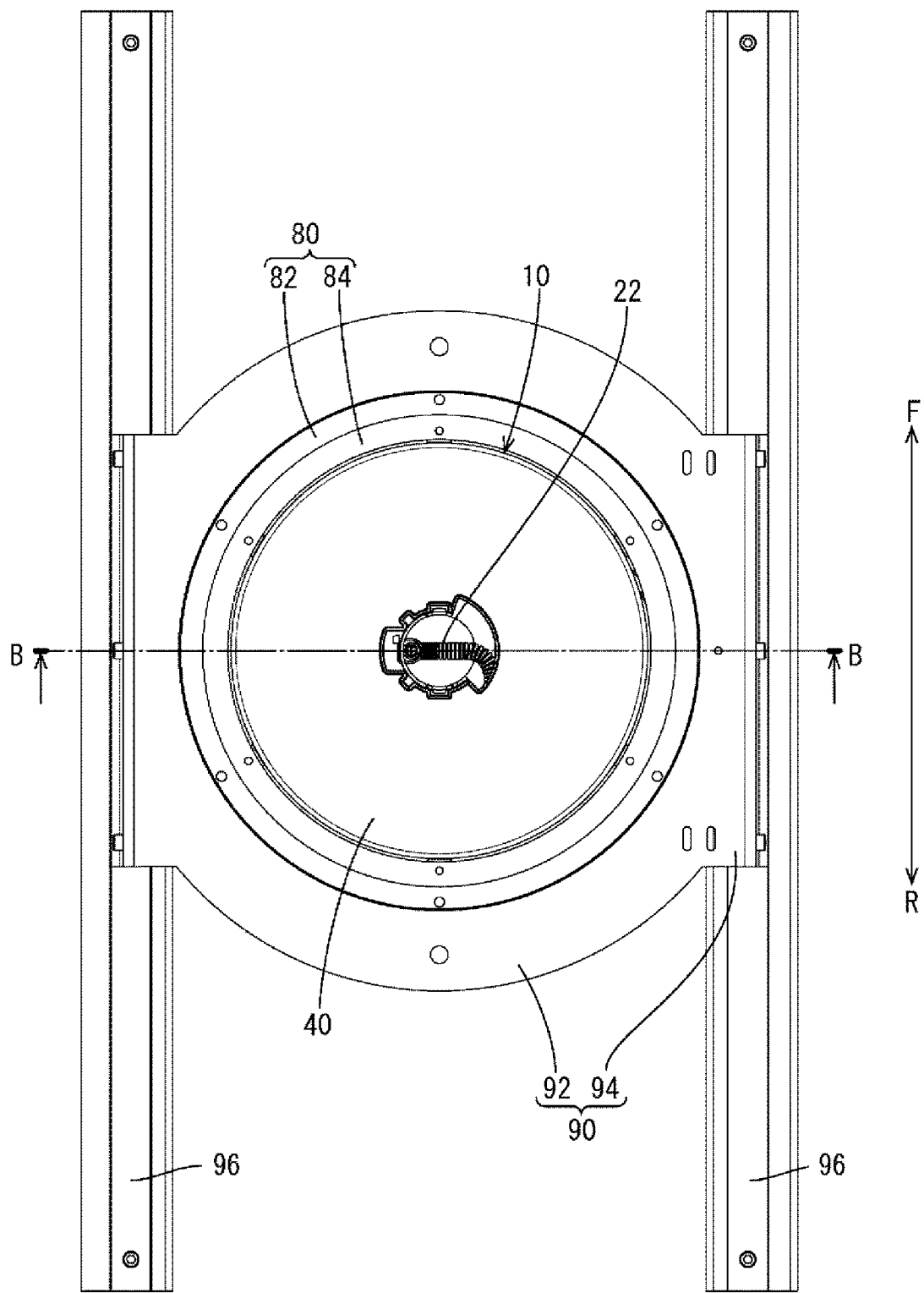
FIG. 12 is a plan view showing a state in which the wire harness routing apparatus is attached to the rotation platform.
Figure 13:
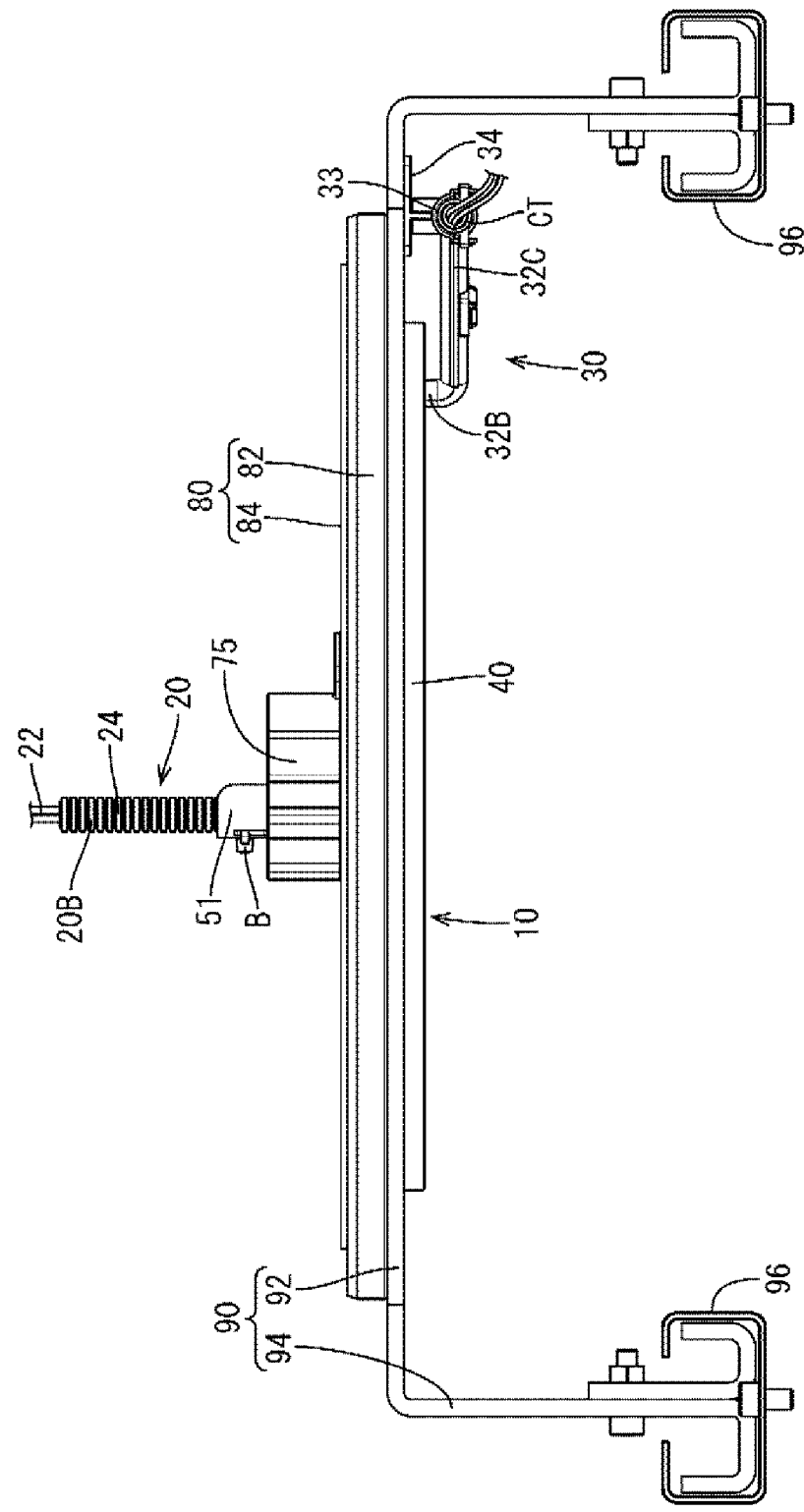
FIG. 13 is a rear view showing a state in which the wire harness routing apparatus is attached to the rotation platform.
Figure 14:
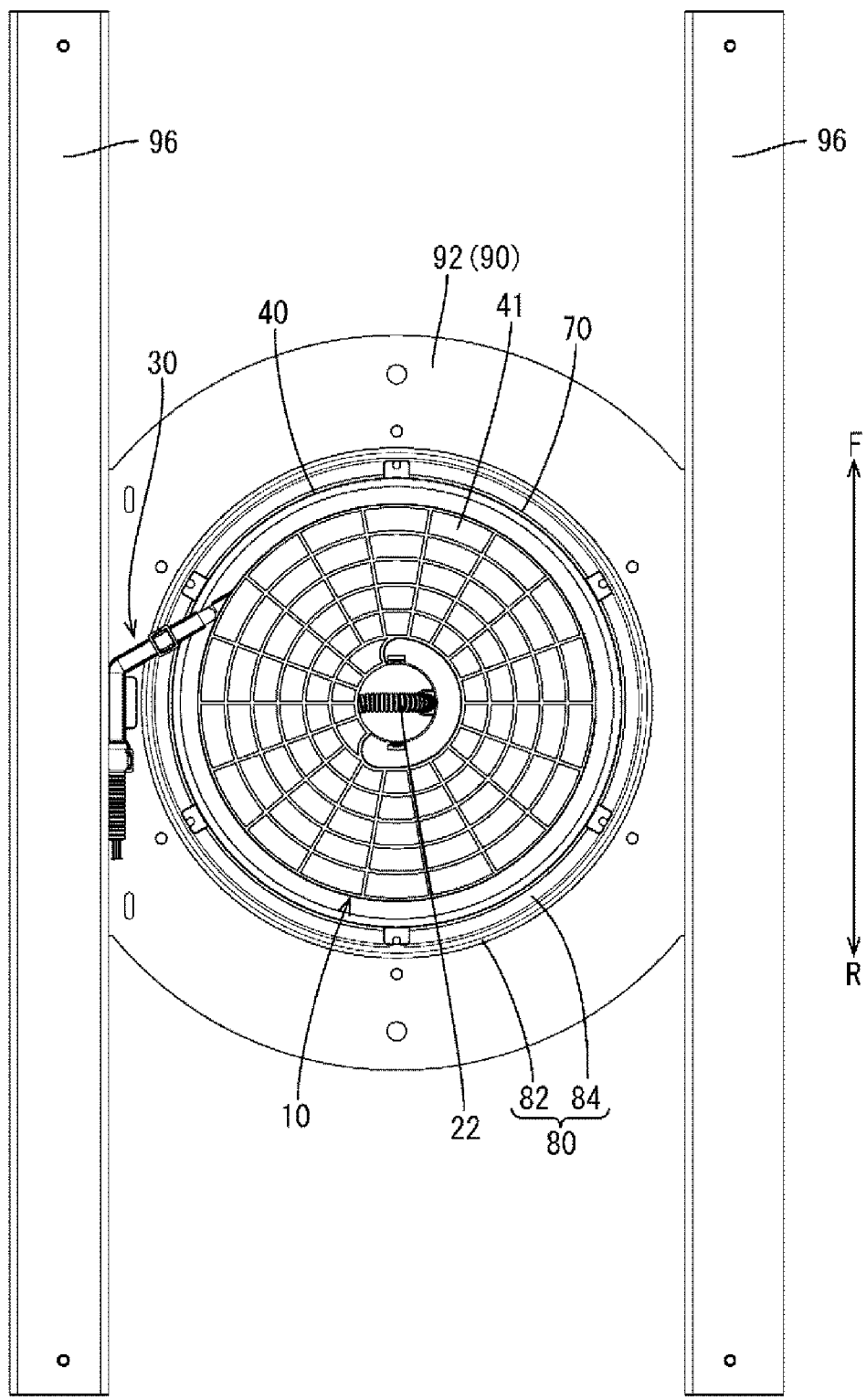
FIG. 14 is a bottom view showing a state in which the wire harness routing apparatus is attached to the rotation platform.

As shown in FIG. 11, the present embodiment illustrates a wire harness routing apparatus 10 having a wire harness 20 that is routed between a seat S and a base portion 90 provided in a vehicle such as an automobile. Note that in the following description, the front-rear direction is described with reference to the directions of the arrows in the drawings, the F side being the front side, and the R side being the rear side.

The seat S is, for example, a seat on a driver's seat side of a vehicle, and as shown in FIGS. 16, 18, 20, 22, and 24, is fixed to a base portion 90 that can slide in a front-rear direction on a pair of metal rails 96 that are fixed to a floor portion of the vehicle.

As shown in FIGS. 10 to 15, the base portion 90 includes a base main body 92 that has an approximately circular frame shape and a pair of leg portions 94 that protrude slightly in the left-right direction from both end portions of the base main body 92 and extend downward.

The pair of leg portions 94 are attached to the pair of rails 96 so as to be able to slide in the front-rear direction, and the rotation platform 80 (an example of a "rotation mechanism") is fixed to the upper surface of the base main body 92.

The pair of leg portions 94 are attached to the pair of rails R so as to be able to slide in the front-rear direction, and the rotation platform 80 (an example of a "rotation mechanism") is fixed to the upper surface of the base main body 92.

The rotation platform 80 is made of metal and includes a base-side pedestal 82 that is fixed to the base main body 92 and a seat-side pedestal 84 that is supported so as to be able to rotate on the base-side pedestal 82.

The base-side pedestal 82 is formed into a flat ring shape and is fixed to the base main body 92 through bolt fastening or the like.

The seat-side pedestal 84 is formed into a flat ring shape that is one size smaller than the base-side pedestal 82, and is fixed to the bottom portion of the seat S through bolt fastening or the like. Also, the seat-side pedestal 84 is attached to the inner side of the base-side pedestal 82 via a bearing, and is allowed to rotate with respect to the base-side pedestal 82 about the axial center of the base-side pedestal 82. Accordingly, the seat S can rotate with respect to the base portion 90.

In the present embodiment, the base-side pedestal 82 and the seat-side pedestal 84 are allowed to rotate mutually using the bearing. However, the base-side pedestal and the seat-side pedestal may also rotate mutually through a known method, such as providing an arc-shaped rail groove on the base-side pedestal and providing a slider that can slide in the rail groove on the seat-side pedestal.

Also, a stopper (not shown) is provided between the base-side pedestal 82 and the seat-side pedestal 84, and due to this stopper, the base-side pedestal 82 and the seat-side pedestal 84 cannot rotate one rotation or more. Accordingly, the seat S can rotate in a 360-degree range of a rightward-facing state (see FIG. 18) reached by rotating 90 degrees clockwise from a frontward-facing state of facing frontward (see FIG. 16), a leftward-facing state (see FIG. 20) reached by rotating 90 degrees counterclockwise from the frontward-facing state, a rearward-facing state (see FIG. 22) reached by rotating 90 degrees from the leftward-facing state, and a rightward-facing state reached by further rotating 90 degrees from the rearward-facing state.

As shown in FIGS. 1 to 5, the wire harness routing apparatus 10 is constituted by including a wire harness 20, a case 40 accommodating the wire harness 20, and a base-side fixing member 30 that fixes one end of the wire harness 20 to the base portion 90.

One end portion of the wire harness 20 is a base-side end portion 20A routed toward the base portion 90, and is connected to a device (not shown) such as an ECU (Electronic Control Unit) of the vehicle. The wire harness 20 routed toward the base portion 90 of the present embodiment is routed, for example, on the floor or under the floor below a mat or a panel from the base portion 90, but this is not shown in the drawings.

On the other hand, the other end portion of the wire harness 20 is a seat-side end portion 20B, and for example, is connected to any electrical component (not shown) on the seat side, such as an electric slide, an electric reclining motor, or a seat heater, which are attached to the seat S. Also, the supply of power and transmission and reception of signals between the devices on the vehicle side and the electrical components of the seat S are performed by the wire harness 20.

Figure 5:
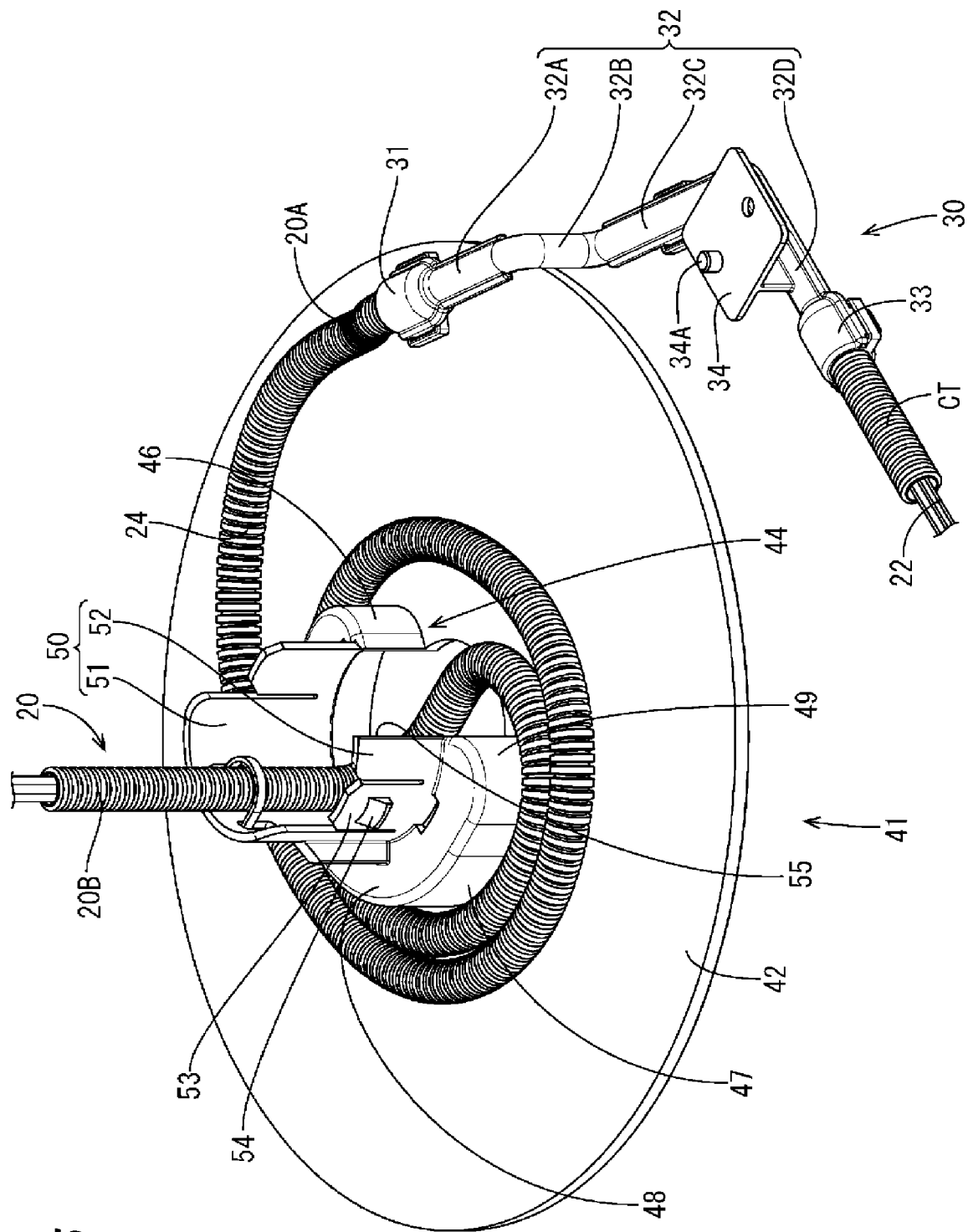
FIG. 5 is a perspective view of a wire harness routing apparatus from which an upper case has been removed.

Also, as shown in FIG. 5, the wire harness 20 is constituted by including multiple (in the present embodiment, five) wires 22 and an outer covering body 24 through which the wires 22 are inserted. The wires 22 are each obtained by covering a core wire composed of metal with excellent conductivity with an insulating covering made of synthetic resin, and the end portion on the seat side of each wire 22 is arranged in the seat S and connected to an electrical component.

Figure 4:
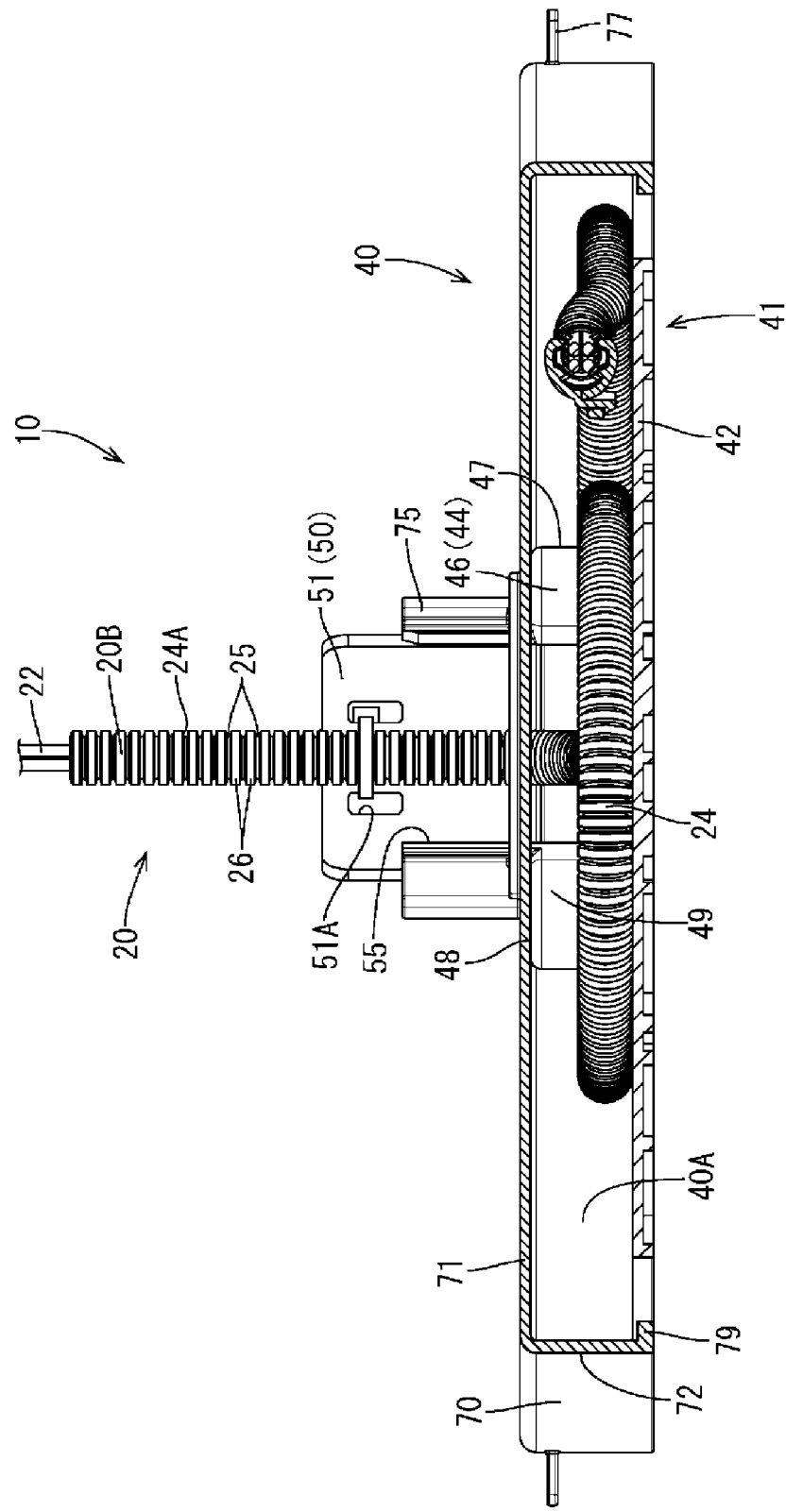
FIG. 4 is a cross-sectional view taken along line A-A of FIG. 2.

The outer covering body 24 is a corrugated tube that is made of an insulating synthetic resin so as to be able to elastically deform, and as shown in FIG. 4, has a bellows shape (corrugated shape) in which small-radius portions 25 and large-radius portions 26 having circular ring shapes are formed alternatingly in the direction in which the outer covering body 24 extends.

Multiple wires 22 can be inserted through the outer covering body 24, and the outer covering body 24 can be bent in any direction with the multiple wires 22 inserted therethrough.

In the present embodiment, as shown in FIGS. 16 to 25, by bringing the end portions on one side of the large-radius portions 26 that are adjacent in the outer covering body 24 close to each other, it is possible to perform bending as appropriate between the base-side end portion 20A and the seat-side end portion 20B with the multiple wires 22 inserted.

The base-side fixing member 30 is made of a synthetic resin, and as shown in FIGS. 5 and 13 to 15, is fixed to the base portion 90 in a state of holding the base-side end portion 20A of the wire harness 20, and is constituted by including an outer covering body holding portion 31 that holds the end portion on the base portion 90 side of the outer covering body 24, a guide tube portion 32 that guides the multiple wires 22 pulled out from the outer covering body 24, a corrugation holding portion 33 that holds a corrugated tube CT through which the multiple wires 22 pulled out from the guide tube portion 32 are inserted, and a fixing piece 34 that fixes the guide tube portion 32 to the base portion 90.

The outer covering body holding portion 31 has an approximately circular tube shape that covers the end portion of the outer covering body 24 of the wire harness 20 from the outside. Ring-shaped fitting portions (not shown) that can fit into recessed portions 24A provided between the small-radius portions 25 and the large-radius portions 26 of the outer covering body 24 are formed over multiple lines on the inner circumferential surface of the outer covering body holding portion 31, and by fitting the ring-shaped fitting portions into the recessed portions 24A of the outer covering body 24, the base-side end portion 20A of the wire harness 20 is held and fixed.

Figure 15:
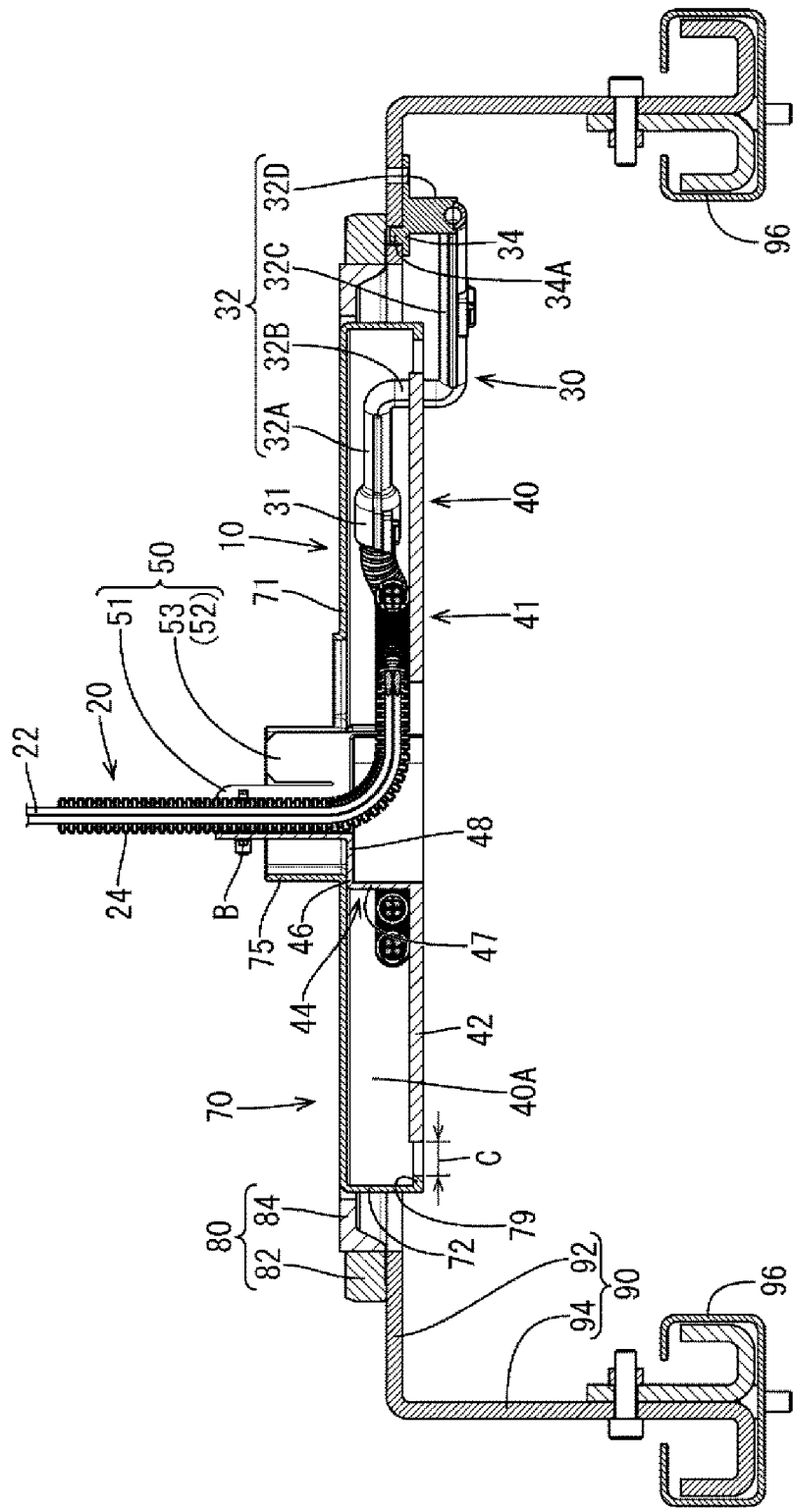
FIG. 15 is a cross-sectional view taken along line B-B in FIG. 12.
Figure 16:
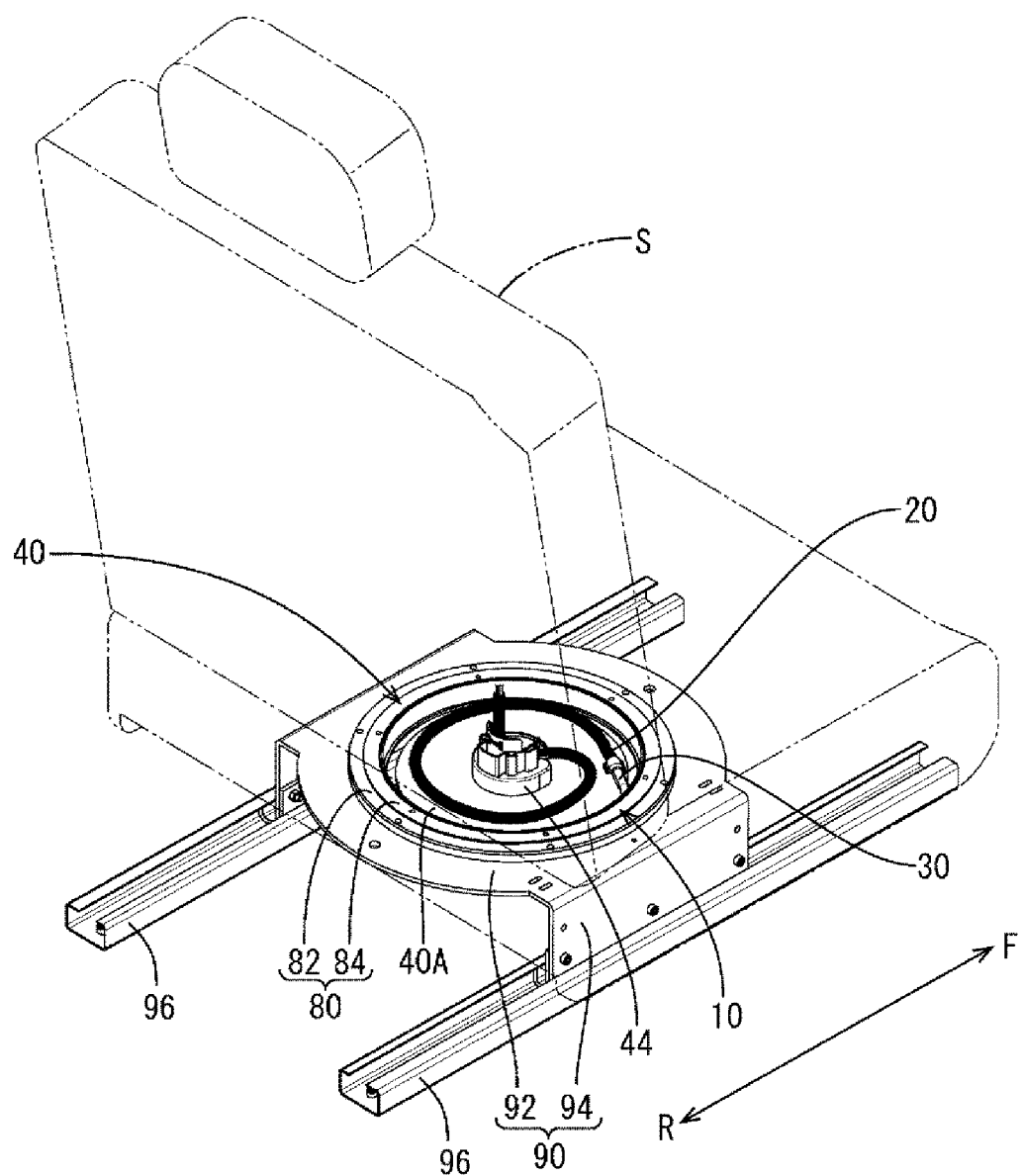
FIG. 16 is a perspective view showing a state in which the case and the seat face frontward.

As shown in FIGS. 5 and 15, the guide tube portion 32 is continuous with the outer covering body holding portion 31 and is formed into a circular tube shape with a smaller radius than the outer covering body holding portion 31, and the multiple wires 22 pulled out from the outer covering body 24 can be inserted through the inner portion of the guide tube portion 32.

The guide tube portion 32 is in a form including a first tube-shaped portion 32A that extends straight in the same direction as the extension direction of the outer covering body holding portion 31 from the end portion of the outer covering body holding portion 31, a second tube-shaped portion 32B that extends downward from the leading end portion of the first tube-shaped portion 32A, a third tube-shaped portion 32C that further extends straight in the same direction as the extension direction of the outer covering body holding portion 31 from the lower end portion of the second tube-shaped portion 32B, and a fourth tube-shaped portion 32D that extends bent from the leading end portion of the third tube-shaped portion 32C. The fixing piece 34 is connected on the upper portion of the fourth tube-shaped portion 32D, and the corrugation holding portion 33 is connected on the leading end of the fourth tube-shaped portion 32D.

The fixing piece 34 has a form that rises upward from the upper portion of the fourth tube-shaped portion 32D and thereafter extends in the horizontal direction, and a circular tube portion 34A that can fit in the plate thickness direction in the base main body 92 of the base portion 90 is provided on the upper surface of the fixing piece 34. Due to the circular tube portion 34A being fit into the base main body 92 and the fixing piece 34 and the base main body 92 being fixed together through bolt fastening or the like, the base-side fixing member 30 is fixed to the base main body 92. That is, the base-side end portion 20A of the wire harness 20 is fixed to the base portion 90 via the base-side fixing member 30.

The case 40 is made of a synthetic resin, and as shown in FIGS. 1 to 9, is formed into a circular shape in plan view. The outer radius dimension of the case 40 is set slightly smaller than the inner radius dimension of the seat-side pedestal 84 of the rotation platform 80, and can be arranged on the inner side in the radial direction of the seat-side pedestal 84 of the rotation platform 80.

Also, as shown in FIG. 15, the case 40 includes an accommodation portion 40A in which the wire harness 20 is accommodated, and the height of the accommodation portion 40A is set slightly larger than the height of the rotation platform 80. That is, the accommodation portion 40A that accommodates the wire harness 20 in the case 40 is approximately accommodated at a position on the inner side in the radial direction of the rotation platform 80.

Multiple (in the present embodiment, six) attachment pieces 77 that protrude outward are provided at equal intervals on the outer peripheral surface of the case 40. A screw recessed portion 78 with a recessed shape is provided on the protruding end portion of each attachment piece 77, and the case 40 is fixed to the seat-side pedestal 84 by inserting a screw through the screw recessed portion 78 and fastening the screw to the seat-side pedestal 84 of the rotation platform 80.

Accordingly, when the case 40 is fixed to the rotation platform 80, the case 40 is arranged along the inner peripheral surface of the seat-side pedestal 84, and as shown in FIGS. 16 to 25, the seat S rotates in a 360-degree range of rotating in a counterclockwise direction from the rightward-facing state of facing rightward to once again reach the rightward-facing state, and the case 40 rotates accompanying the rotation of the seat S about the rotation axis of the rotation platform 80.

Also, as shown in FIGS. 4 and 15, the case 40 includes a lower case 41 and an upper case 70 that is attached to the lower case 41 from above, and the accommodation portion 40A is formed by the lower case 41 and the upper case 70 by attaching the upper case 70 to the lower case 41 from above.

The lower case 41 includes a flat plate-shaped bottom plate portion 42 that has an outer shape that is circular in plan view, and a seat-side fixing portion 44 provided on the bottom plate portion 42.

The wire harness 20 that was pulled out from the outer covering body holding portion 31 of the base-side fixing member 30 can be placed on the bottom plate portion 42. Also, when the case 40 is fixed to the rotation platform 80 in a state in which the base-side fixing member 30 is fixed to the base portion 90, the outer covering body holding portion 31 of the base-side fixing member 30 holding the base-side end portion 20A of the wire harness 20, and the first tube-shaped portion 32A of the guide tube portion 32 are arranged in a state of rising slightly upward from the bottom plate portion 42.

Also, the second tube-shaped portion 32B in the guide tube portion 32 of the base-side fixing member 30 extends downward relative to the bottom plate portion 42 at a position on the outer side with respect to the outer peripheral edge of the bottom plate portion 42, and when the case 40 rotates in accordance with the seat S, the second tube-shaped portion 32B rotates and moves relatively in a 360-degree range on the outer periphery of the bottom plate portion 42.

Figure 8:
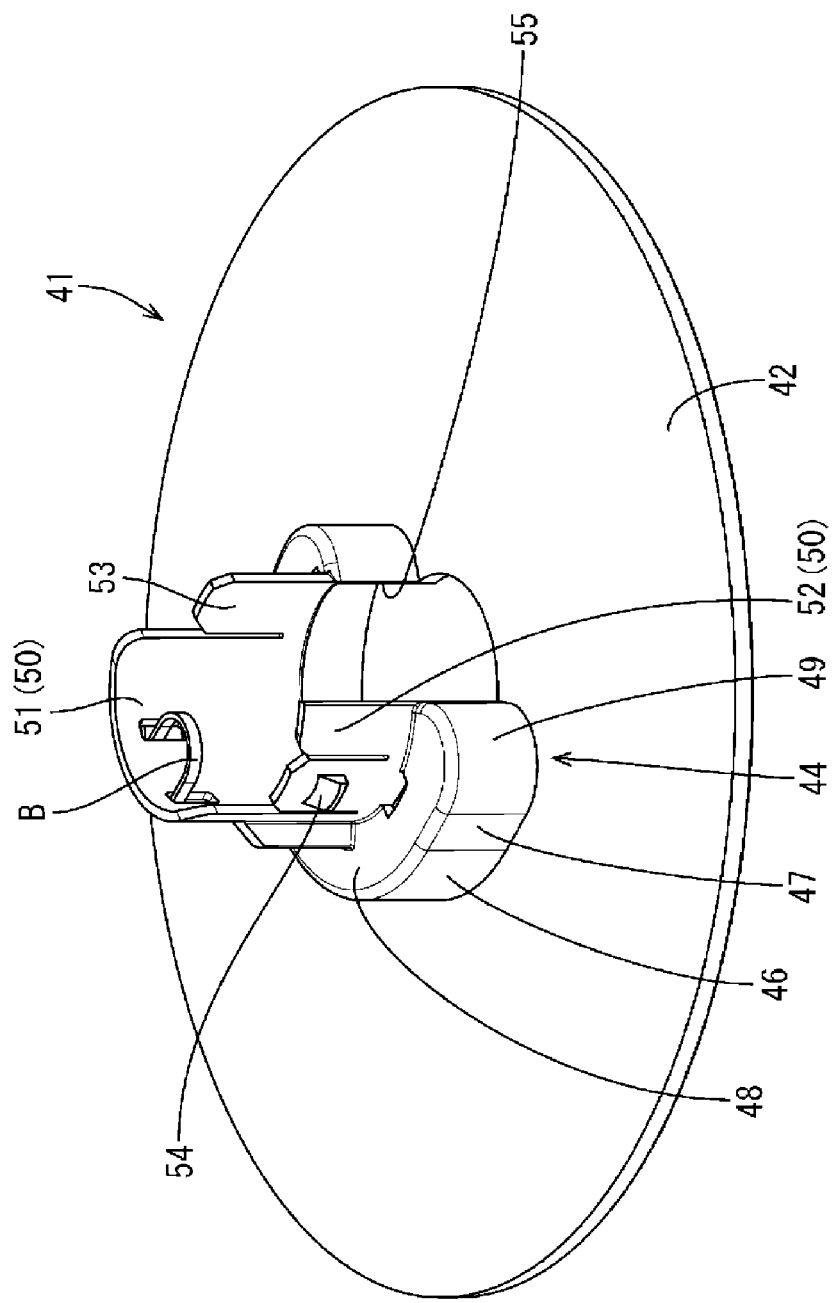
FIG. 8 is a perspective view of a lower case.
Figure 9:
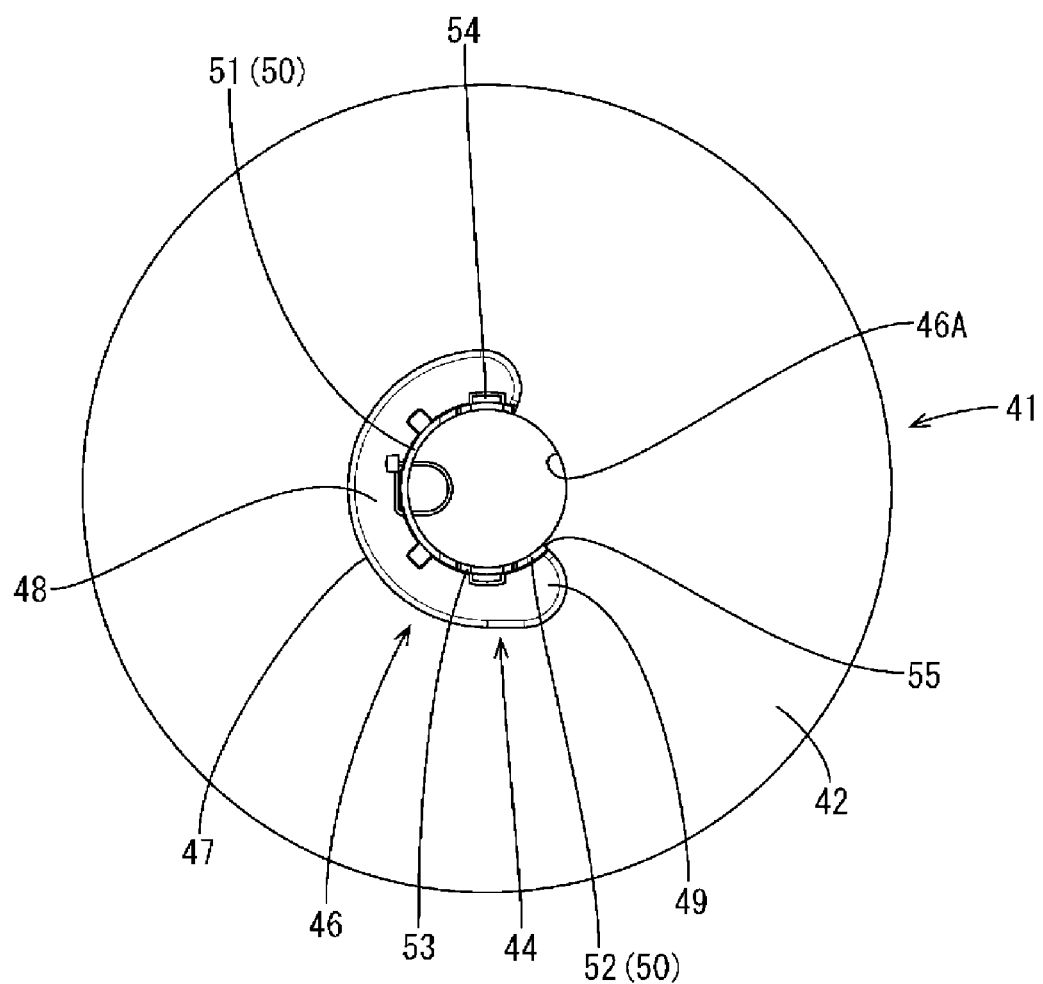
FIG. 9 is a plan view of a lower case.
Figure 10:
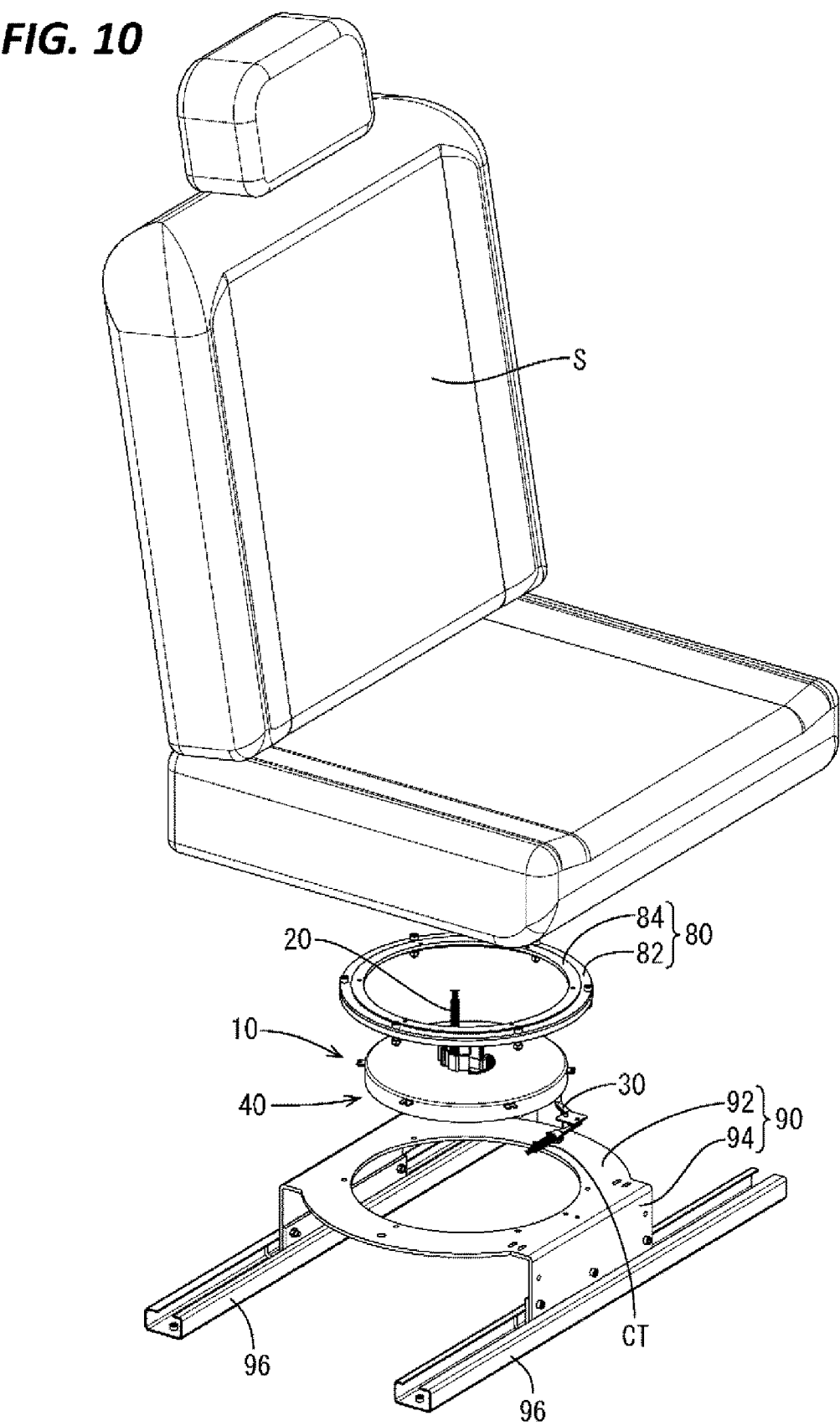
FIG. 10 is an exploded perspective view showing a state prior to attaching the seat, the rotation platform, the wire harness routing apparatus, and the base portion.

As shown in FIGS. 5, 8, and 9, the seat-side fixing portion 44 includes a protruding portion 46 that protrudes upward from the bottom plate portion 42 and a standing wall 50 that is provided standing further upward from the upper surface of the protruding portion 46.

The protruding portion 46 is formed in a form that is rounded at the center of the bottom plate portion 42 in a view from above, and through holes 46A that penetrate through the protruding portion 46 in the up-down direction are provided at the center of the protruding portion 46.

The protruding portion 46 includes a protruding side wall 47 that is provided standing on the bottom plate portion 42, and a protruding upper wall 48 that extends in the horizontal direction from the upper end portion of the protruding side wall 47 toward the center of the bottom plate portion 42, and a through hole 46A is provided in the form of a circular hole in the protruding upper wall 48.

The protruding upper wall 48 is formed in an approximate ring shape at a portion of the opening edge so as to extend along the opening edge of the through hole 46A, and the right-side end portion of the protruding upper wall 48 is an overhang portion 49 that hangs over toward the outer side in the radial direction. The overhang end portion of the overhang portion 49 is formed into an approximately circular shape with a larger radius of curvature than the allowable radius of curvature of the outer covering body 24 of the wire harness 20.

The protruding side wall 47 has a form connecting the outer peripheral edge of the protruding upper wall 48 and the bottom plate portion 42 in the up-down direction, and is a curved surface that extends along the axial center of the bottom plate portion 42 at the central portion of the bottom plate portion 42. Accordingly, the protruding side wall 47 is not formed at the portion of the opening edge of the through hole 46A at which the protruding upper wall 48 is not provided.

Similarly to the protruding portion 46, the standing wall 50 is formed into an approximate ring shape at a portion of the opening edge so as to extend along the opening edge of the through hole 46A, and the portion at which the standing wall 50 is formed is a portion that is similar to the protruding portion 46 in the through hole 46A.

The standing wall 50 includes a high standing wall 51 with a high height in the up-down direction, and low standing walls 52 with a height lower than that of the high standing wall 51, and the low standing walls 52 are arranged on both sides of the high standing wall 51.

An elastic piece 53 that can elastically deform toward the inner side in the radial direction due to being provided with a slit that extends vertically is provided on each low standing wall 52, and a locking protrusion 54 that protrudes outward is provided on each elastic piece 53.

Similarly to the protruding side wall 47, the standing wall 50 is not formed at the portion that opposes the high standing wall 51 in the standing wall 50.

That is, the portion at which the standing wall 50 is not formed and the portion at which the protruding side wall 47 is not formed in the protruding portion 46 are positions that are arranged side by side in the up-down direction in the seat-side fixing portion 44, and the portions at which the standing wall 50 and the protruding side wall 47 are not present are harness insertion ports 55 through which the inner-side portion surrounded by the protruding side wall 47 and the standing wall 50 and the outer-side portions of the protruding side wall 47 and the standing wall 50 are in communication with each other.

As shown in FIG. 5, the wire harness 20 placed on the bottom plate portion 42 is pulled in through the harness insertion port 55 at the central portion of the bottom plate portion 42 surrounded by the protruding side wall 47 and the standing wall 50, and the wire harness 20 pulled in through the harness insertion port 55 is guided toward the upper side, which is the seat S side, by being bent upward so as to extend along the high standing wall 51.

A pair of band insertion holes 51A that penetrate in the wall thickness direction are provided on the high standing wall 51, and the seat-side end portion 20B of the wire harness 20 is fixed to the central portion of the bottom plate portion 42 by inserting a bundling band B through the pair of band insertion holes 51A and bundling the outer covering body 24 of the wire harness 20 together with the high standing wall 51. In other words, in the seat-side fixing portion 44, the seat-side end portion 20B of the wire harness 20 is fixed near the rotational center of the case 40.

Also, as shown in FIGS. 16 to 25, the wire harness 20 fixed to the seat-side fixing portion 44 is pulled out from the harness insertion port 55 onto the bottom plate portion 42, and thereafter is arranged so as to surround the seat-side fixing portion 44 at least once, and the base-side end portion 20A is held in the base-side fixing portion 30. Note that in FIGS. 16 to 25, a later-described top plate 71 of the upper case 70 is not illustrated in order to make it easier to understand the arrangement state of the wire harness 20.

Figure 17:
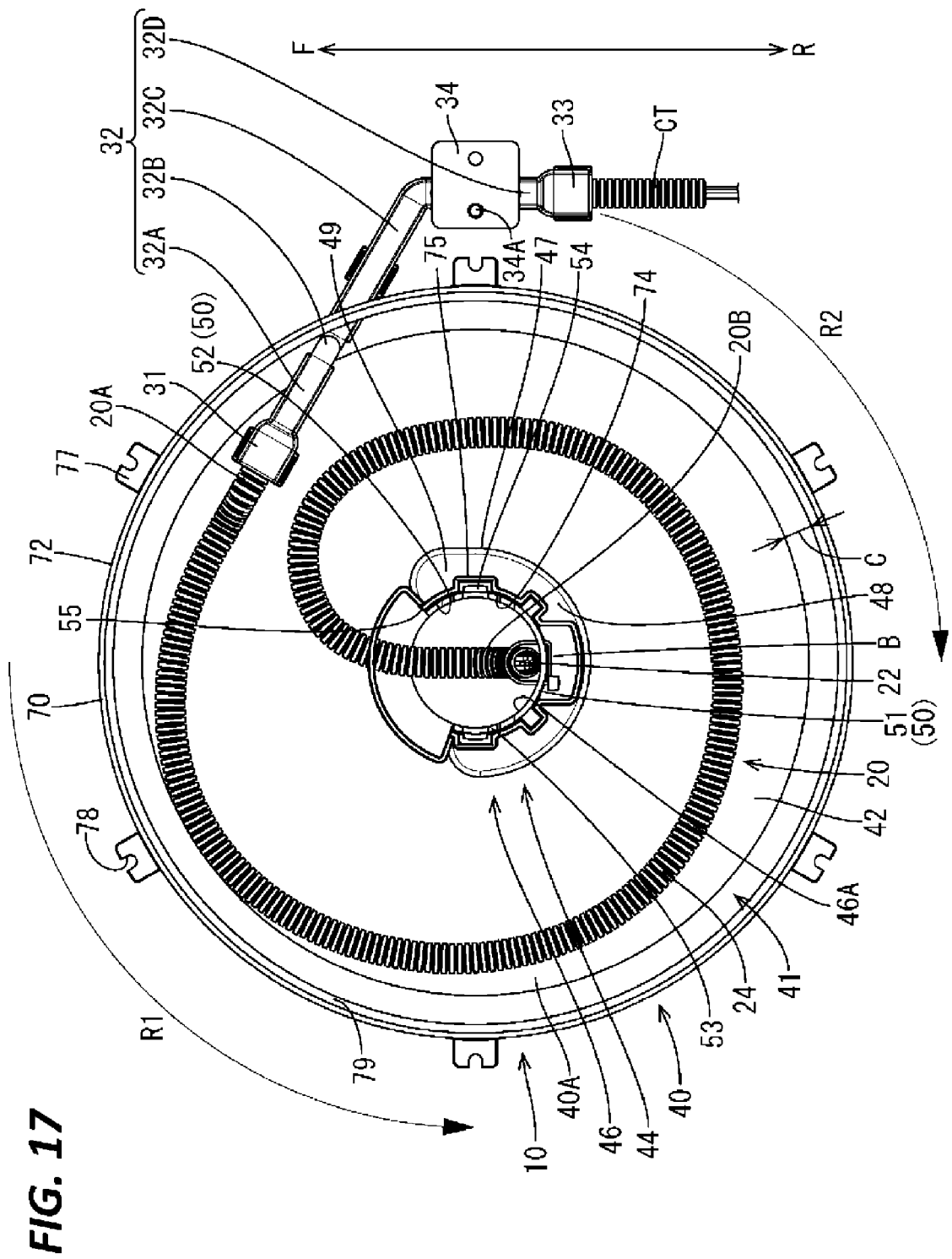
FIG. 17 is a plan view showing a state in which the case faces rightward.
Figure 18:
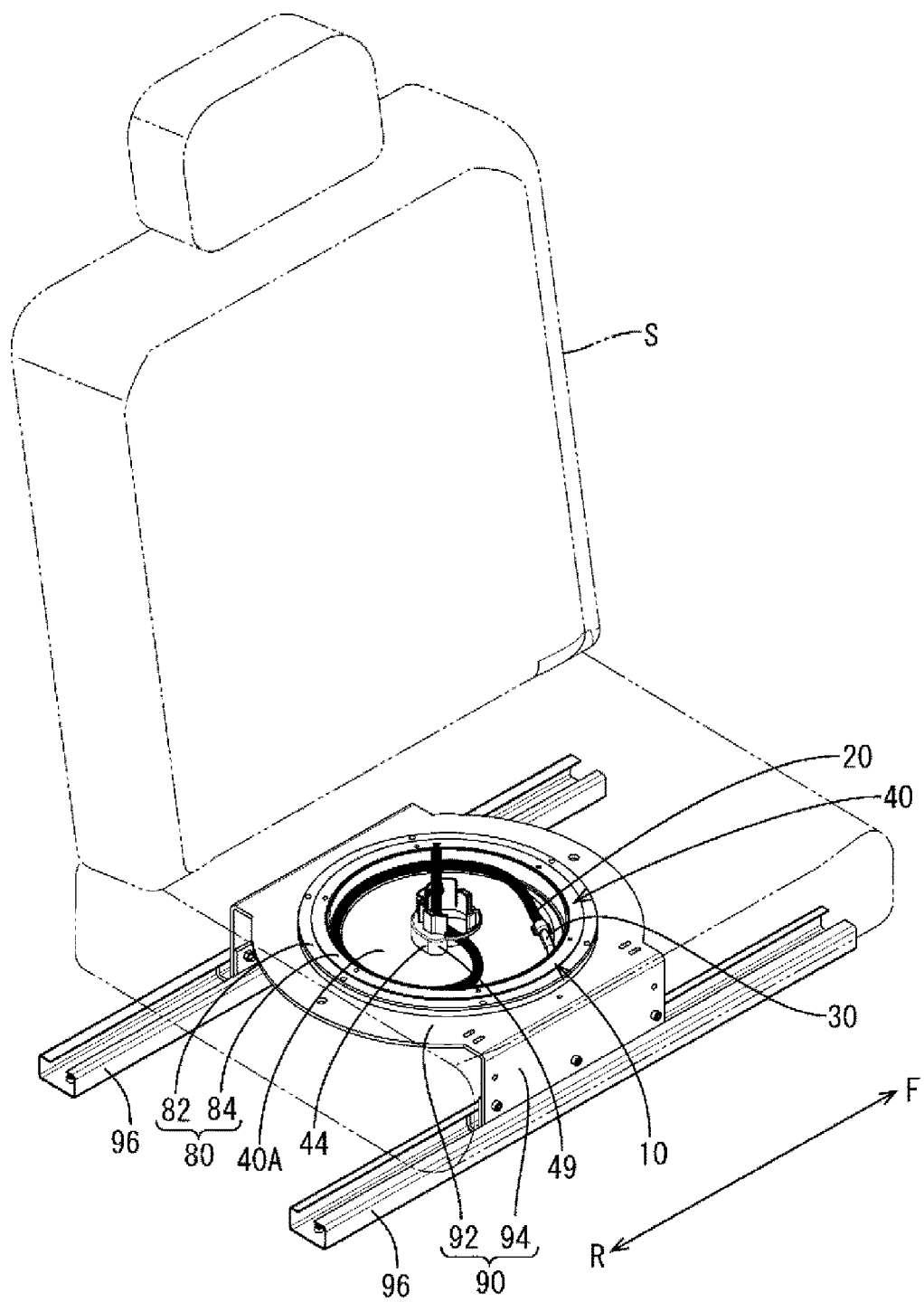
FIG. 18 is a perspective view showing a state in which the case and the seat have changed from facing frontward to facing rightward.

Specifically, when the case 40 reaches a frontward-facing state shown in FIG. 17, the wire harness 20 is arranged so as to be pulled out obliquely rightward and frontward from the seat-side fixing portion 44, thereafter be folded over rearward, and thereafter loosely surround the seat-side fixing portion 44 once.

Figure 19:
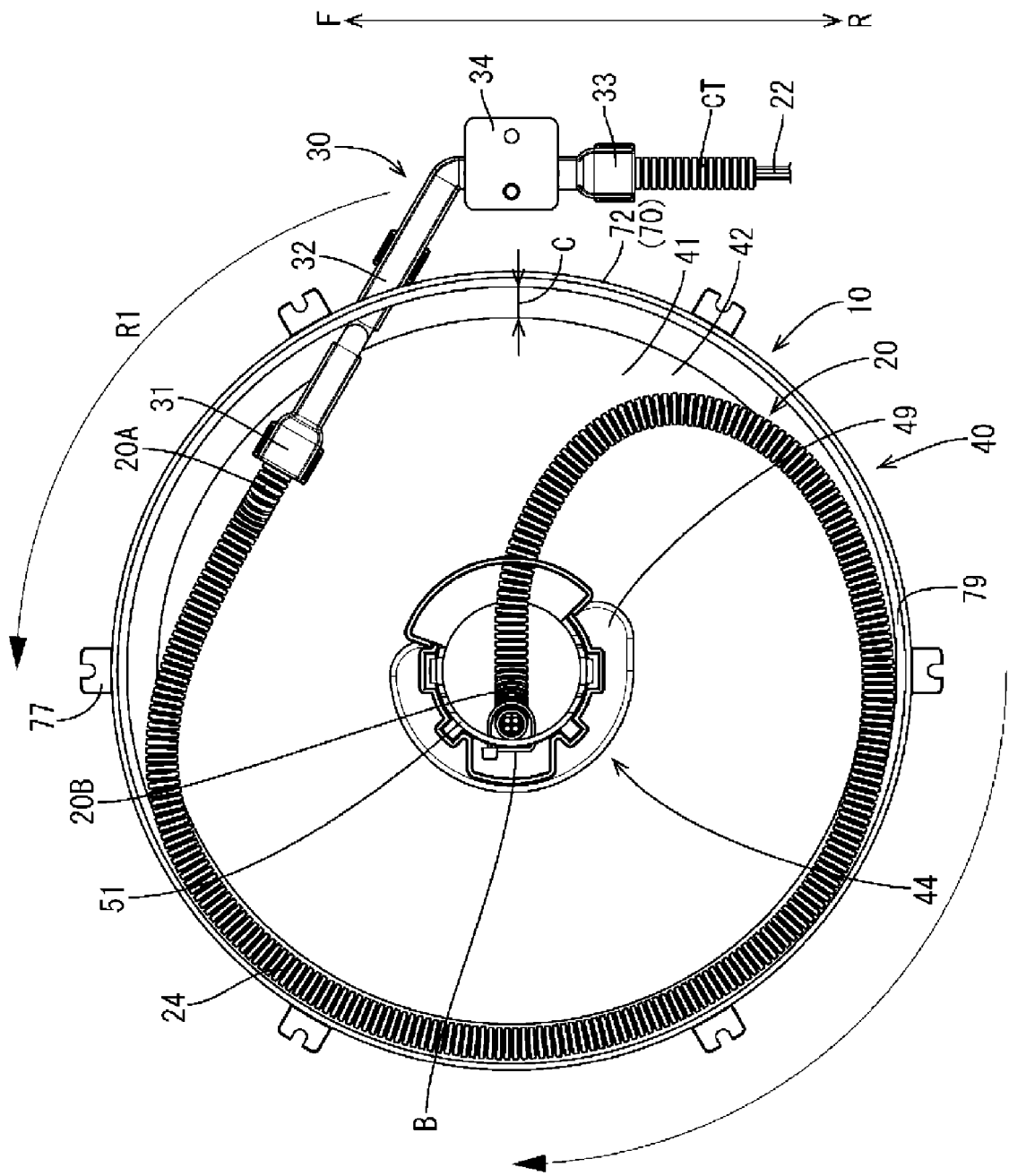
FIG. 19 is a plan view showing a state in which the case has changed from facing frontward to facing rightward.
Figure 20:
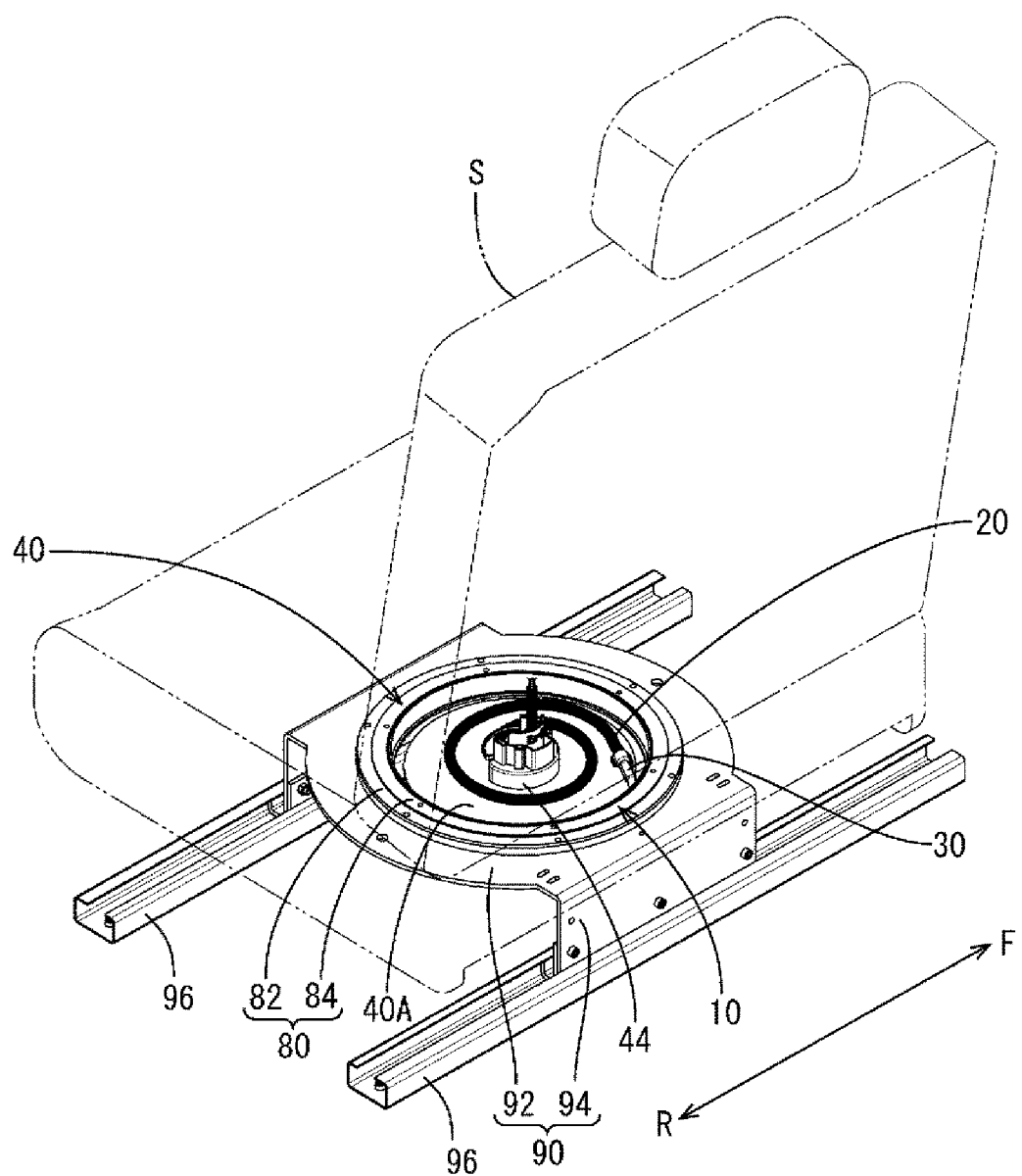
FIG. 20 is a perspective view showing a state in which the case and the seat face leftward.

Also, as shown in FIG. 19, when the case 40 reaches a rightward-facing state from the frontward-facing state, the wire harness 20 is arranged so as to be pulled out rightward from the seat-side fixing portion 44, thereafter be folded over obliquely leftward and rearward, and thereafter surround the seat-side fixing portion 44 approximately once so as to extend along a later-described circular side wall 72 of the upper case 70.

Also, when the case 40 is rotated leftward R1, which is counterclockwise, together with the seat S from the rightward-facing state shown in FIG. 19, the wire harness 20 is wrapped by the seat-side fixing portion 44.

Figure 21:
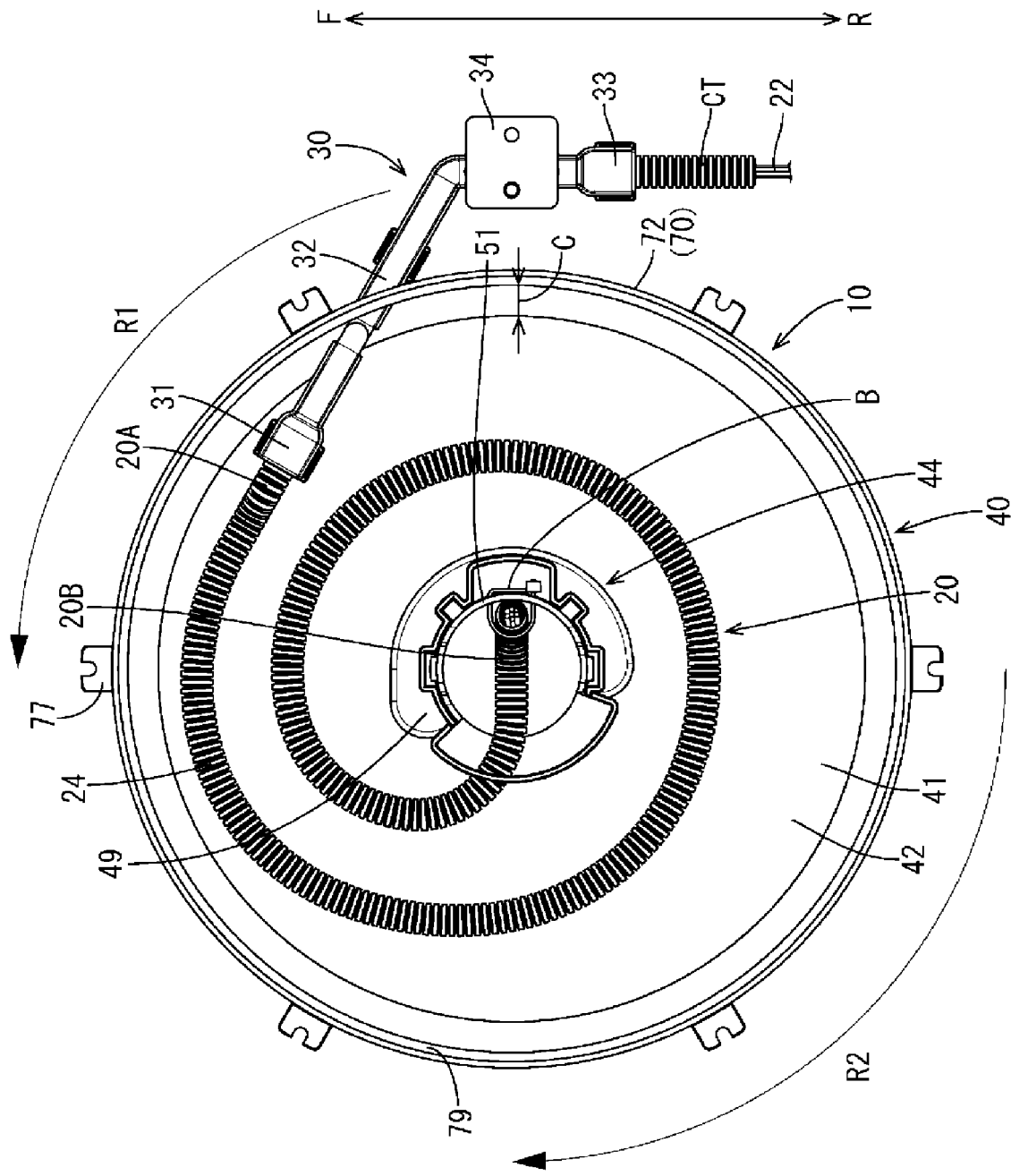
FIG. 21 is a plan view showing a state in which the case faces leftward.
Figure 22:
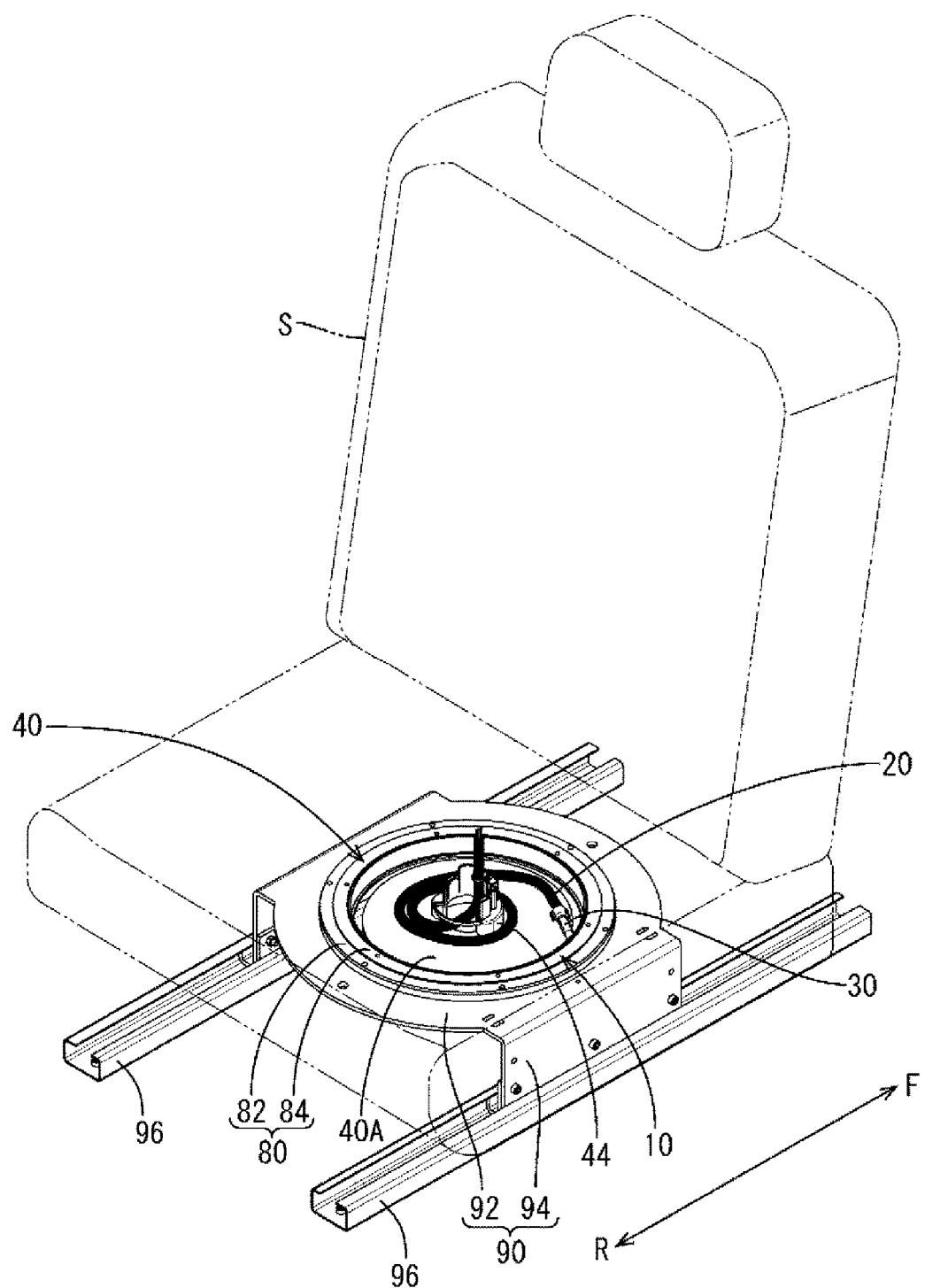
FIG. 22 is a perspective view showing a state in which the case and the seat face rearward.

Specifically, when the wire harness 20 is wrapped around the seat-side fixing portion 44 and the case 40 reaches a leftward-facing state from the frontward-facing state as shown in FIG. 21, the wire harness 20 is arranged so as to be pulled out leftward from the seat-side fixing portion 44, thereafter be bent frontward, and thereafter loosely surround the seat-side fixing portion 44 approximately one and a half times.

Figure 23:
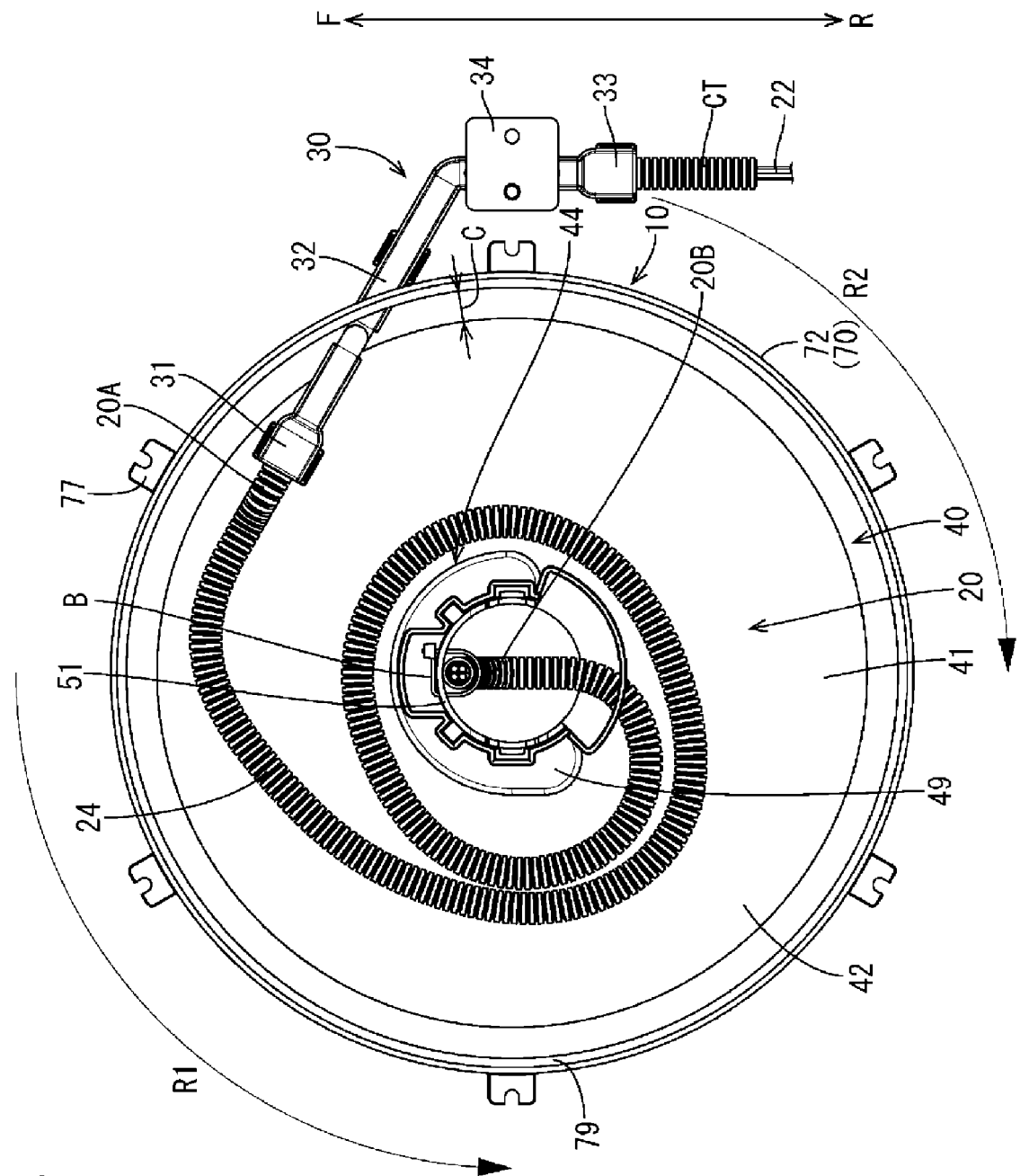
FIG. 23 is a plan view showing a state in which the case faces rearward.
Figure 24:
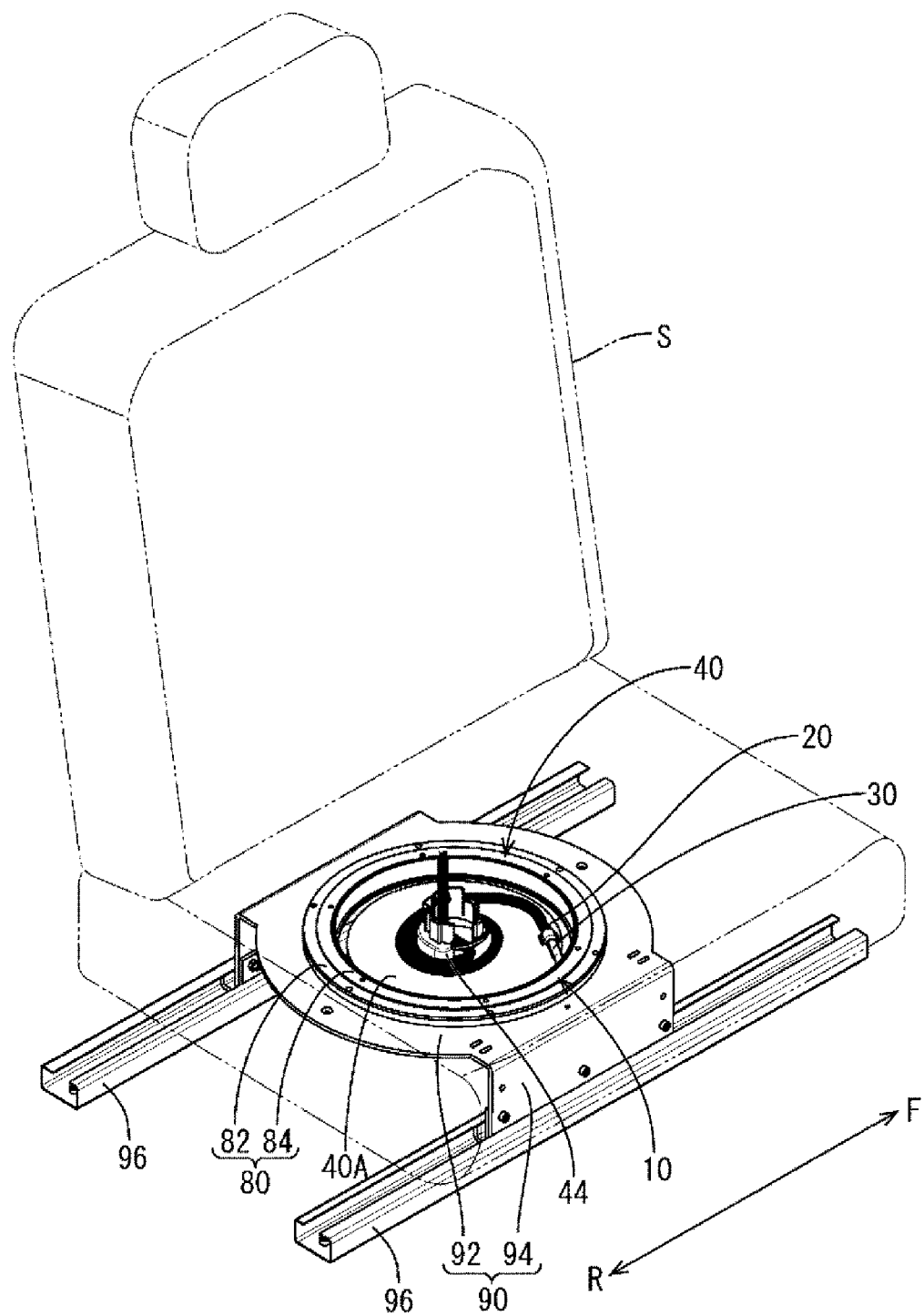
FIG. 24 is a perspective view showing a state in which the case and the seat have changed from facing rearward to facing rightward.

Furthermore, when the case 40 is rotated leftward R1, the wire harness 20 is wrapped around the seat-side fixing portion 44, and when the case 40 enters a rearward-facing state from the leftward-facing state as shown in FIG. 23, the wire harness 20 is arranged so as to be pulled out rearward from the seat-side fixing portion 44, thereafter be bent leftward, and thereafter extend along the protruding side wall 47 of the protruding portion 46 of the seat-side fixing portion 44. Also, the wire harness 20 is arranged so as to surround the seat-side fixing portion 44 one and a half times.

Figure 25:
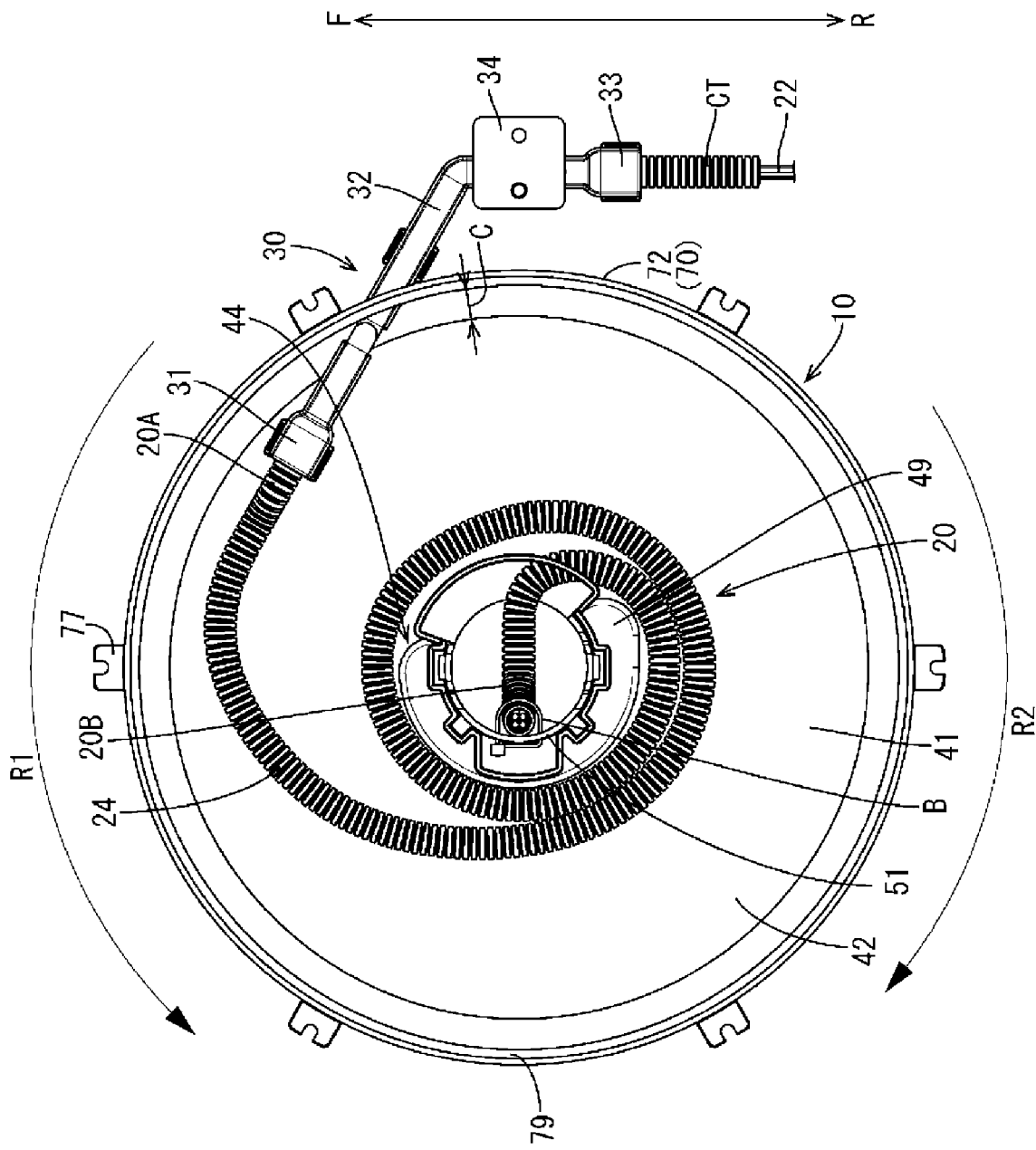
FIG. 25 is a plan view showing a state in which the case has changed from facing rearward to facing rightward.

Also, as shown in FIG. 25, when the case 40 once again faces rightward from facing rearward and the wire harness 20 is wrapped around the seat-side fixing portion 44, the wire harness 20 is arranged so as to be pulled out rightward from the seat-side fixing portion 44, thereafter be bent rearward, and thereafter surround the seat-side fixing portion 44 approximately twice in a state of being in contact with the protruding side wall 47 of the protruding portion 46 of the seat-side fixing portion 44.

On the other hand, upon rotating rightward R2, which is clockwise, from the state of facing rightward from facing rearward as shown in FIG. 25, conversely, the wire harness 20 wrapped around the seat-side fixing portion 44 enters a state of being unwrapped from the seat-side fixing portion 44, and is arranged in a state of surrounding the seat-side fixing portion 44 once as shown in FIGS. 17, 19, 21, and 23.

Figure 1:
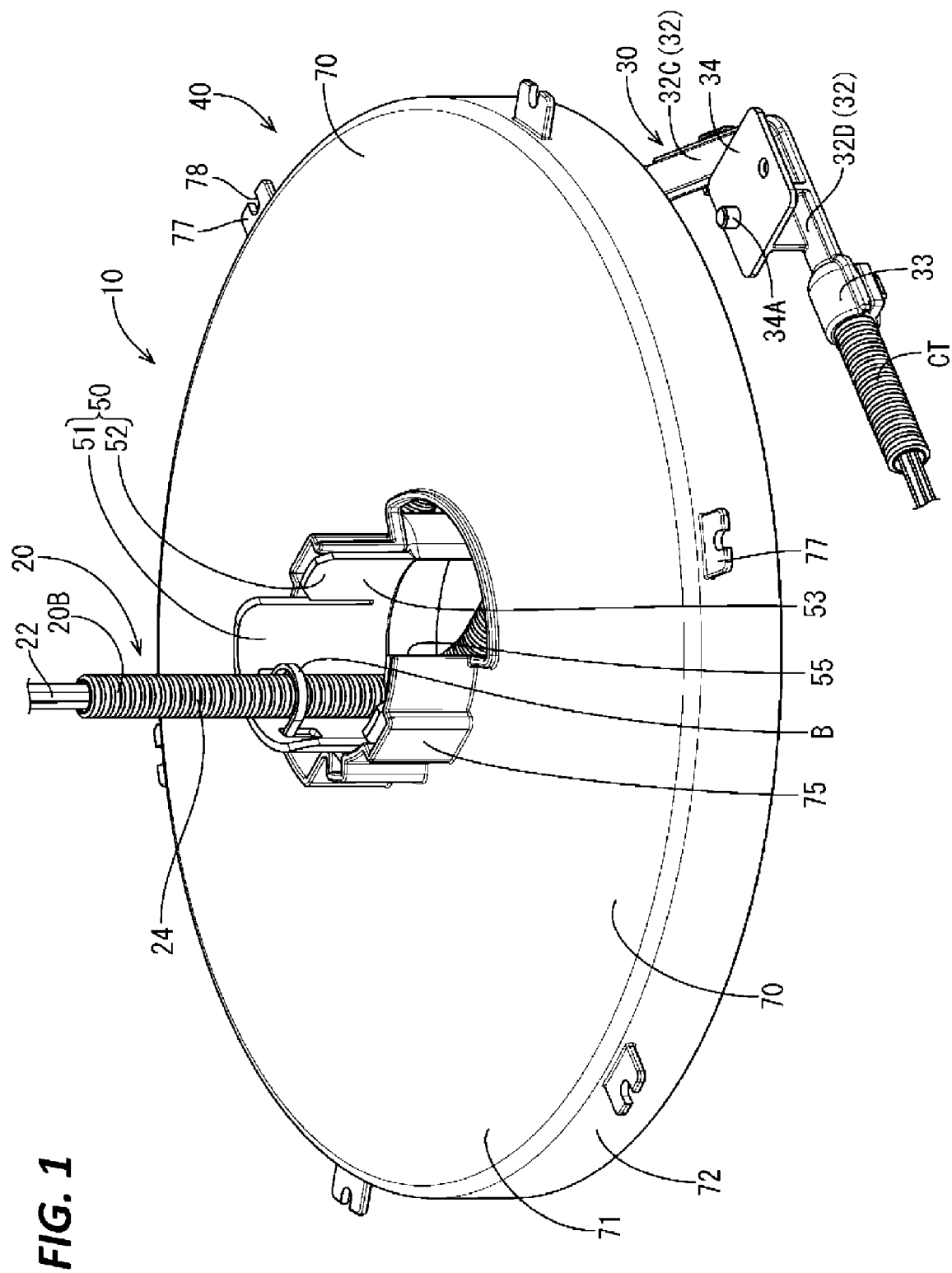
FIG. 1 is a perspective view of a wire harness routing apparatus according to a first embodiment.
Figure 2:
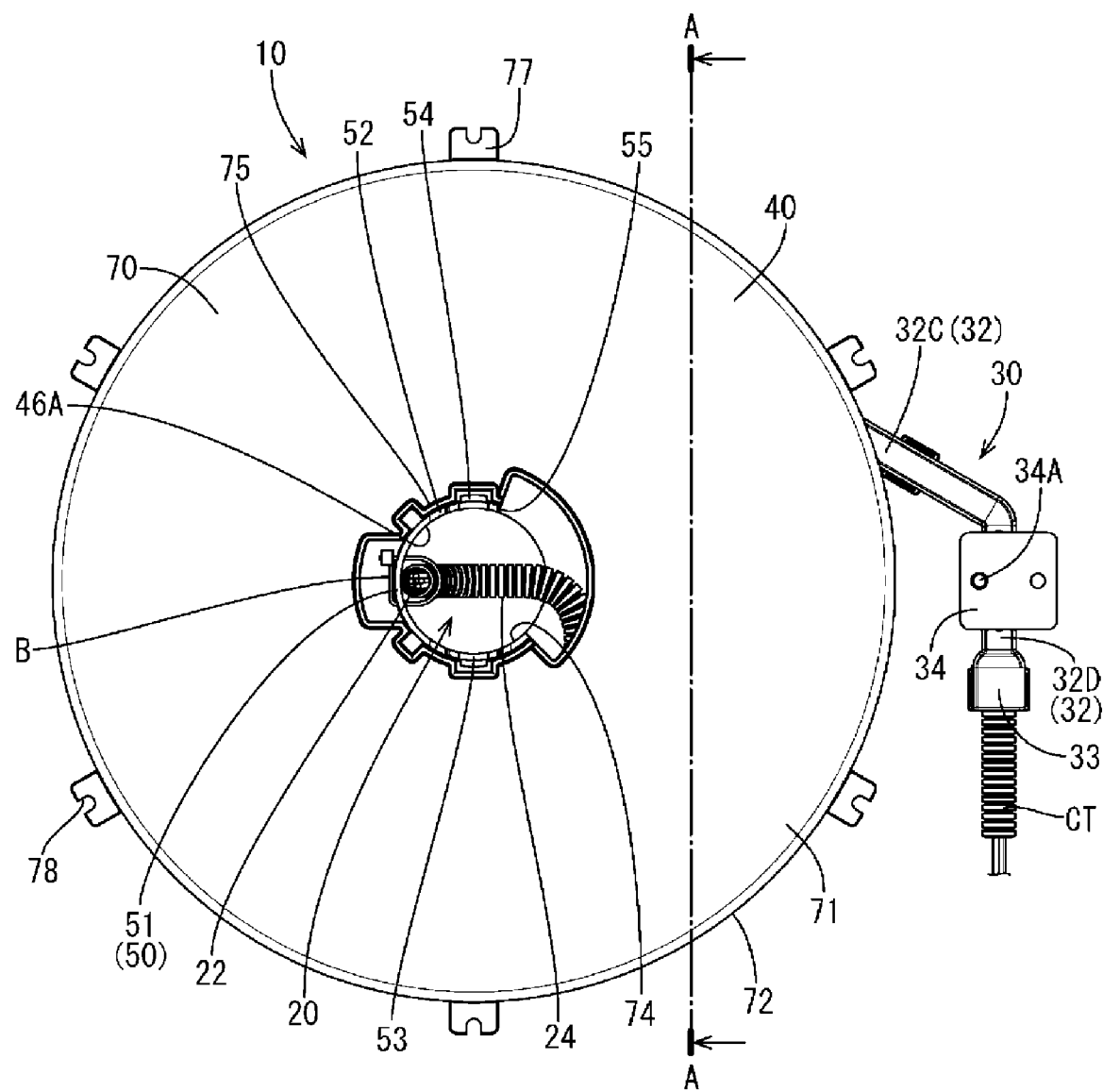
FIG. 2 is a plan view of a wire harness routing apparatus.
Figure 3:
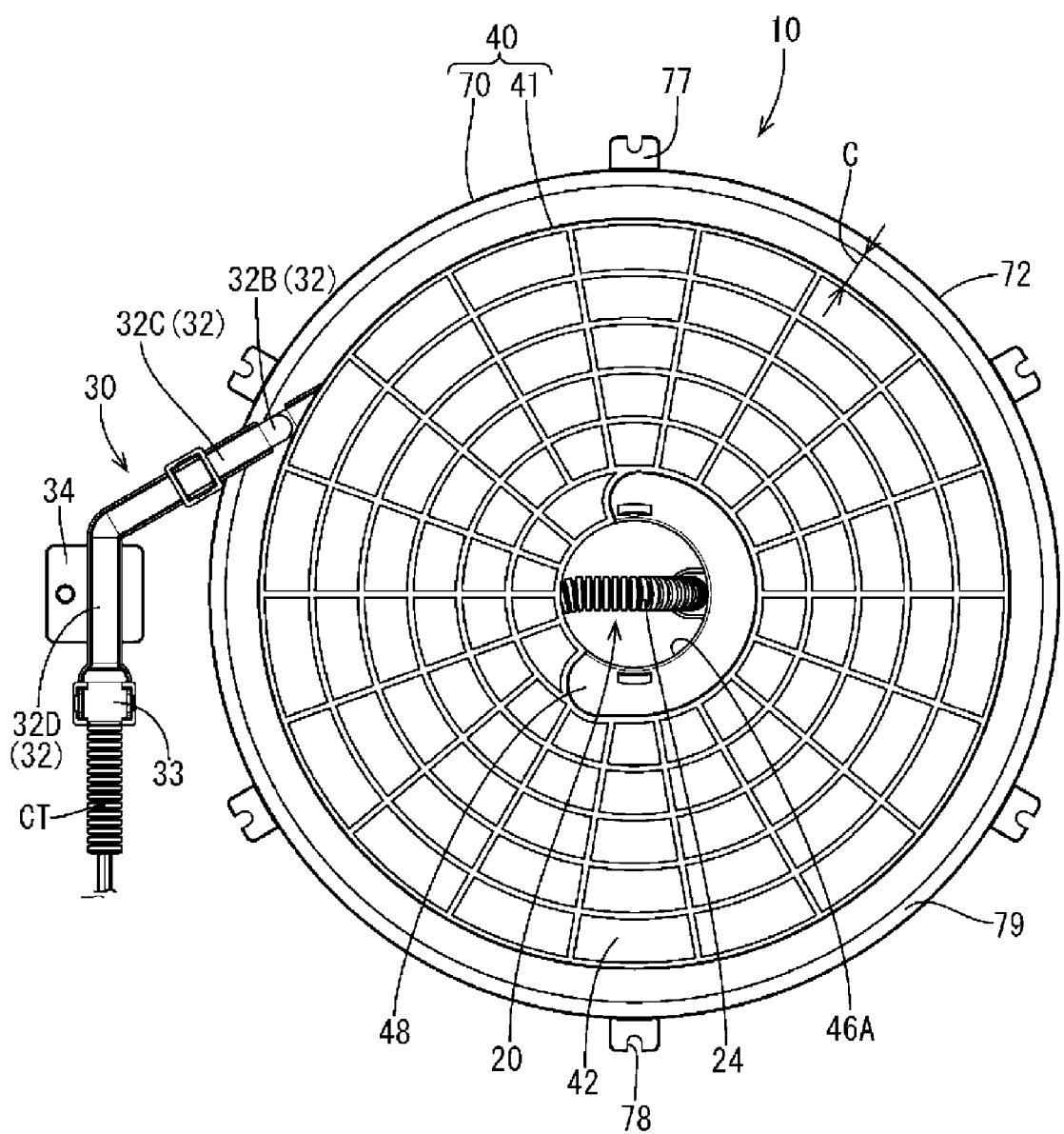
FIG. 3 is a bottom view of a wire harness routing apparatus.
Figure 6:
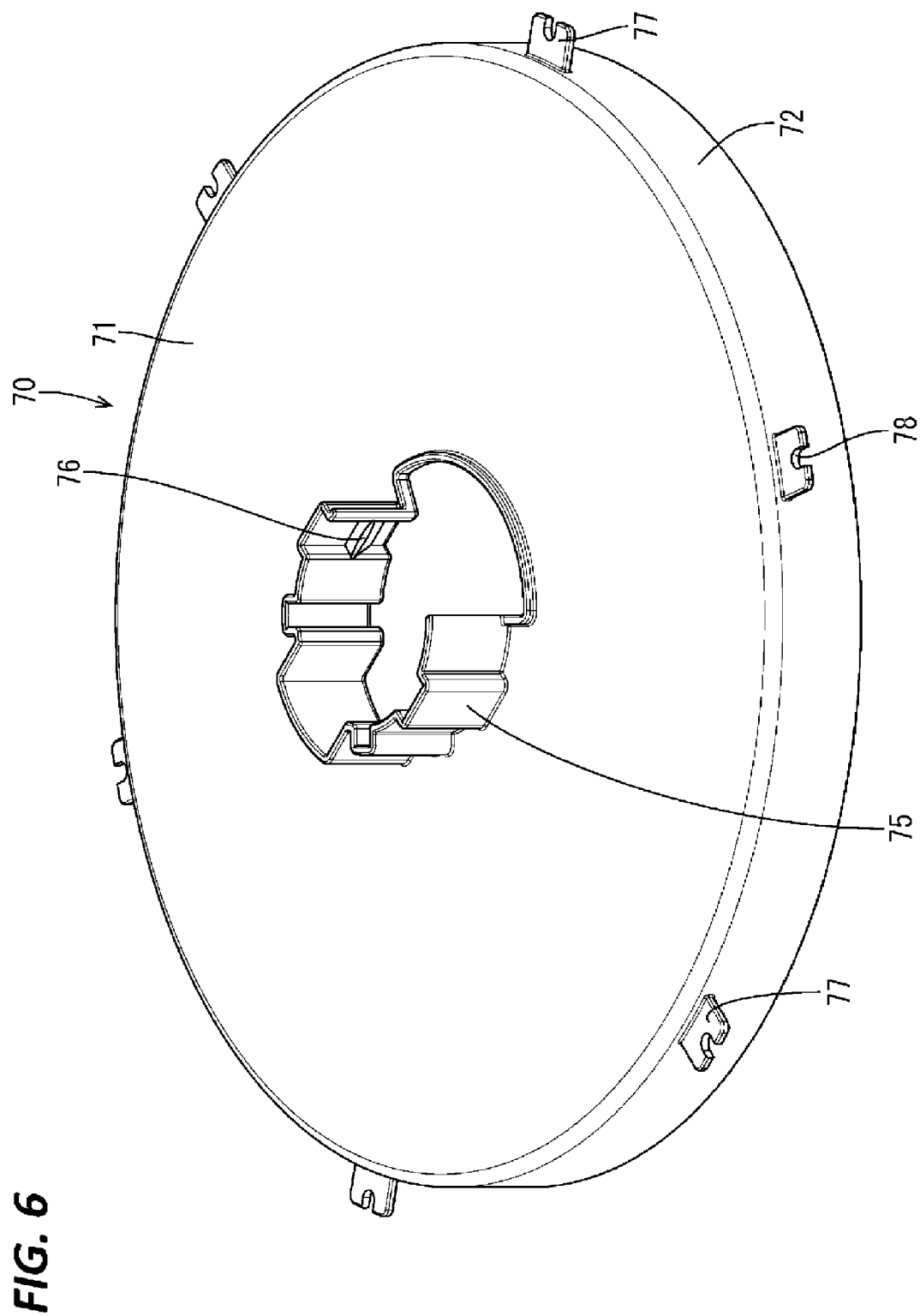
FIG. 6 is a perspective view of an upper case.
Figure 7:
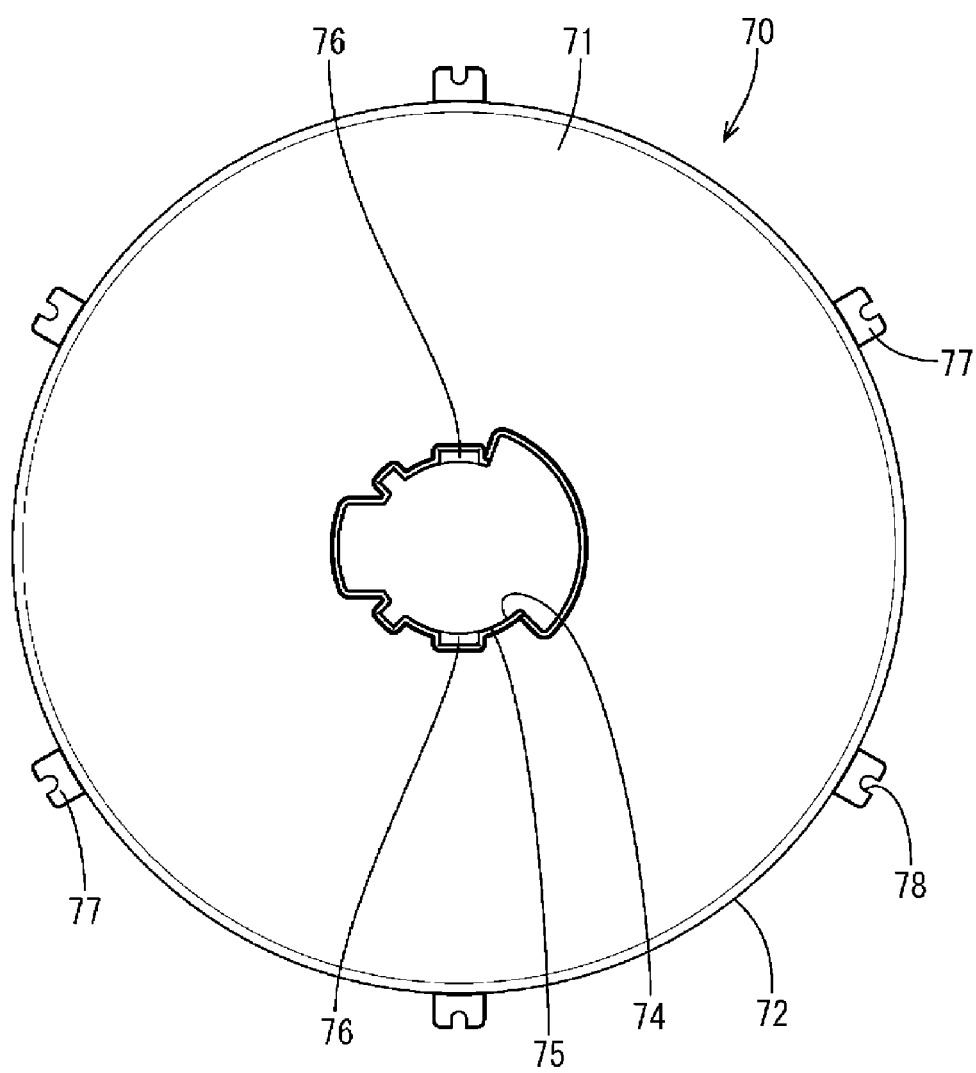
FIG. 7 is a plan view of an upper case.

Next, the upper case 70 will be described. As shown in FIGS. 1, 6, and 7, the upper case 70 is constituted by including a top plate 71 that has a circular flat plate shape, a circular side wall 72 that is provided on the top plate 71, and a lock wall portion 75 that is provided on the upper surface of the top plate 71.

The top plate 71 has an outer radius that is slightly larger than the outer radius of the bottom plate portion 42 of the lower case 41, and an insertion hole 74 that penetrates in the up-down direction, which is the plate thickness direction, is provided in the center of the top plate 71.

When the upper case 70 is attached to the lower case 41 from above, the standing wall 50 of the seat-side fixing portion 44 of the lower case 41 is inserted through the insertion hole 74 from below.

The lock wall portion 75 is provided on a portion of the opening edge of the insertion hole 74. The lock wall portion 75 has a circular arc shape, and when the upper case 70 is attached to the lower case 41, the lock wall portion 75 is arranged along the outer periphery of the standing wall 50. Also, the insertion hole 74 is expanded into a fan shape at the portion of the opening edge of the insertion hole 74 at which the lock wall portion 75 is not formed. Locked portions 76 are provided at positions on the inner peripheral surface of the lock wall portion 75 that correspond to the elastic pieces 53 of the standing wall 50, and when the upper case 70 is attached to the lower case 41, the upper case 70 is held in a state of being attached to the lower case 41 due to the locking protrusions 54 of the elastic pieces 53 and the locked portions 76 engaging with each other in the up-down direction.

A circular side wall 72 is formed continuously on the outer peripheral edge of the top plate 71. The circular side wall 72 has a form extending downward from the outer peripheral edge of the top plate 71, and multiple attachment pieces 77 are provided at equal intervals on the outer surface of the circular side wall 72.

As shown in FIGS. 4 and 15, the height in the up-down direction of the circular side wall 72 is set to be slightly greater than the height of the protruding portion 46 of the lower case 41. When the lower case 41 and the upper case 70 are attached to each other, the circular side wall 72 covers the wire harness 20 arranged on the bottom plate portion 42 of the lower case 41 together with the top plate 71, and the accommodation portion 40A that accommodates the wire harness 20 is formed by the top plate 71, the circular side wall 72, and the bottom plate portion 42.

Also, a harness reception portion 79 that protrudes slightly inward in the radial direction from the lower end portion of the circular side wall 72 is provided on the lower end portion of the circular side wall 72.

When the lower case 41 and the upper case 70 are attached to each other, the harness reception portion 79 opposes the outer peripheral edge of the bottom plate portion 42 of the lower case 41 over the entire periphery, and a gap C is formed between the harness reception portion 79 and the outer peripheral edge of the bottom plate portion 42 of the lower case 41. The gap dimension between the harness reception portion 79 and the outer peripheral edge of the bottom plate portion 42 is set to be slightly larger than the outer radius of the second tube-shaped portion 32B of the guide tube portion 32 of the base-side fixing member 30, and when the base-side fixing member 30 is fixed to the base portion 90 and the case 40 is fixed to the rotation platform 80, the second tube-shaped portion 32B is arranged in the gap C between the harness reception portion 79 and the outer peripheral edge of the bottom plate portion 42.

Also, as shown in FIG. 19, the harness reception portion 79 supports the wire harness 20 from below when the wire harness 20 is arranged on the inner peripheral surface of the circular side wall 72. That is, for example, when the wire harness 20 is arranged along the inner peripheral surface of the circular side wall 72 due to the reaction force of the wire harness 20 or the like, the wire harness 20 is supported from below by the harness reception portion 79, and therefore the outer covering body 24 of the wire harness 20 can prevent the case 40 from being pulled to the outer side from the gap C.

The present embodiment will describe a configuration such as that described above, and then operations and effects of the wire harness routing apparatus 10.

If the space between the seat S and the floor portion of the vehicle is limited, such as a case in which the space between the bottom portion of the vehicle and the seat S is used for another application, in general, it is more difficult to arrange the wire harness routing apparatus. Also, as with the present embodiment, if the rotation angle of the seat is made large, such as 360 degrees, the excess length of the wire harness increases, and therefore it is even more difficult to arrange the wire harness routing apparatus.

However, according to the present embodiment, the case 40 can be arranged on the inner side in the radial direction of the seat-side pedestal 84 of the rotation platform 80, and the accommodation portion 40A that accommodates the wire harness 20 in the case 40 is approximately accommodated at a position on the inner side in the radial direction of the rotation platform 80.

That is, since the case 40 is arranged at a position on the inner side in the radial direction of the seat-side pedestal 84, which is dead space in the seat-side pedestal 84 of the rotation platform 80, even if the space between the base portion 90 to which the seat S is fixed and the floor portion of the vehicle is limited, the wire harness routing apparatus 10 for accommodating the wire harness 20 can be installed.

Also, according to the present embodiment, the seat-side pedestal 84 has a ring shape, and since the case 40 is formed into a circular shape so as to extend along the inner peripheral surface of the seat-side pedestal 84, the excess length of the wire harness 20 can be accommodated in the space on the entire inner side of the seat-side pedestal 84.

That is, for example, compared to the case where a case with a rectangular shape or a small circular shape is arranged, the wire harness 20 that can be accommodated in the case 40 can be made longer. That is, as with the present embodiment, this is effective in the case where the rotation range of the seat S increases and the excess length of the wire harness 20 increases.

Also, according to the present embodiment, the case 40 can be rotated while positioning the positions of both end portions of the wire harness 20 due to the base-side end portion 20A of the wire harness 20 being held and fixed by the base-side fixing member 30 and the seat-side end portion 20B being fixed by the seat-side fixing portion 44 of the lower case 41. Also, when the seat S is rotated in the leftward R1 direction, which is counterclockwise, the wire harness 20 is wrapped around the seat-side fixing portion 44, and when the seat S is rotated in a rightward R2 direction, which is clockwise, the wire harness 20 that was wrapped around the seat-side fixing portion 44 is unwrapped and is arranged around the seat-side fixing portion 44. That is, due to the case 40 being rotated in a 360-degree range in accordance with the seat S, the excess length of the longer wire harness 20 can be accommodated with leeway in the case 40.

Furthermore, according to the present embodiment, the overhang portion 49, which has a radius of curvature that is greater than the allowed radius of curvature of the outer covering body 24 of the wire harness 20, is provided on the protruding portion 46 of the seat-side fixing portion 44.

That is, when the wire harness 20 is wrapped around the seat-side fixing portion 44, the wire harness 20 is loosely bent along the overhang portion 49, and therefore it is possible to suppress a case in which the wire harness 20 is excessively bent at the wrapping center of the wire harness 20, and it is possible to prevent the wire harness 20 from breaking.

Second Embodiment

Next, a second embodiment will be described with reference to FIGS. 26 to 29.

Figure 26:
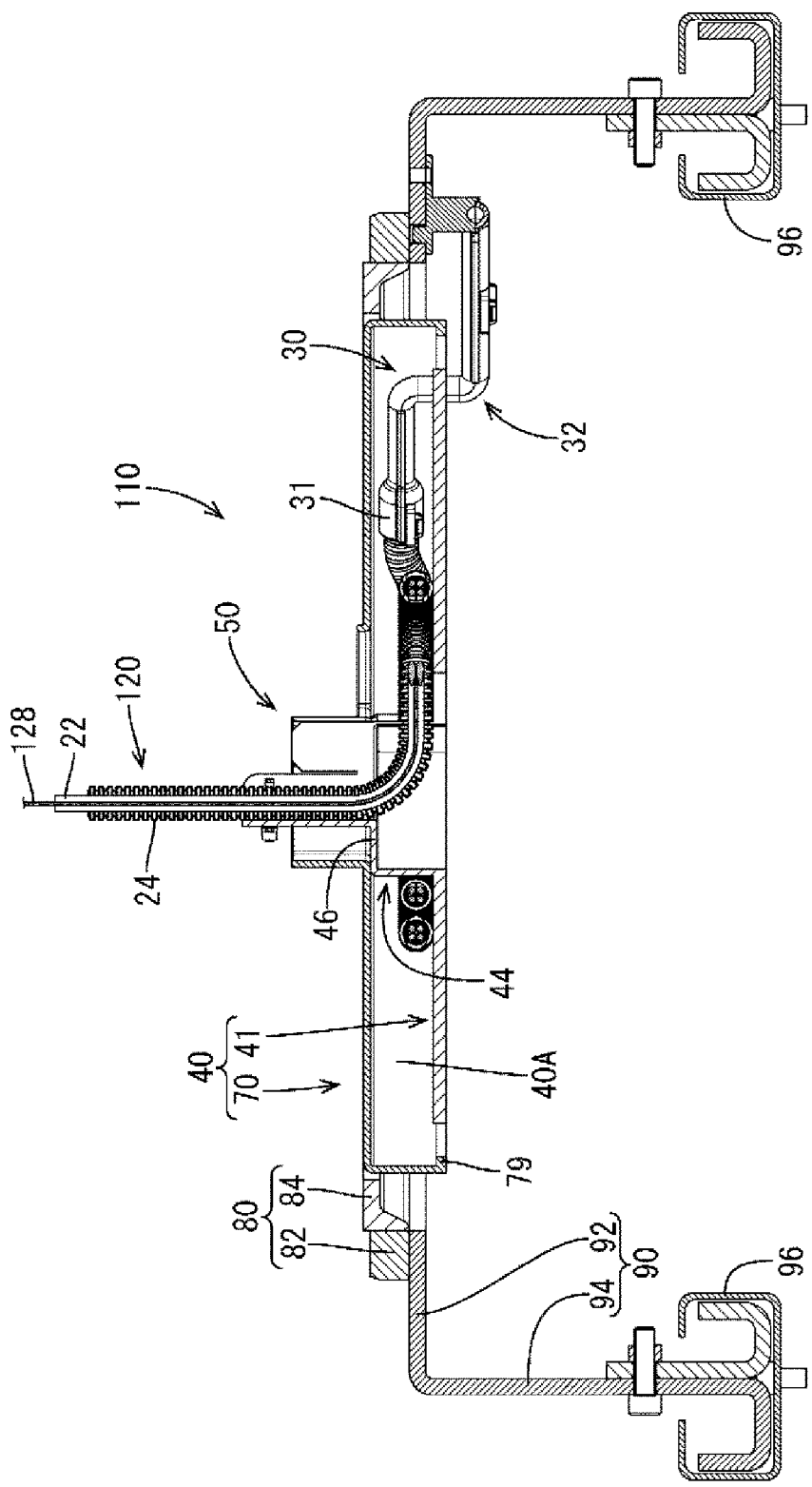
FIG. 26 is a cross-sectional view corresponding to FIG. 15 of the second embodiment.
Figure 27:
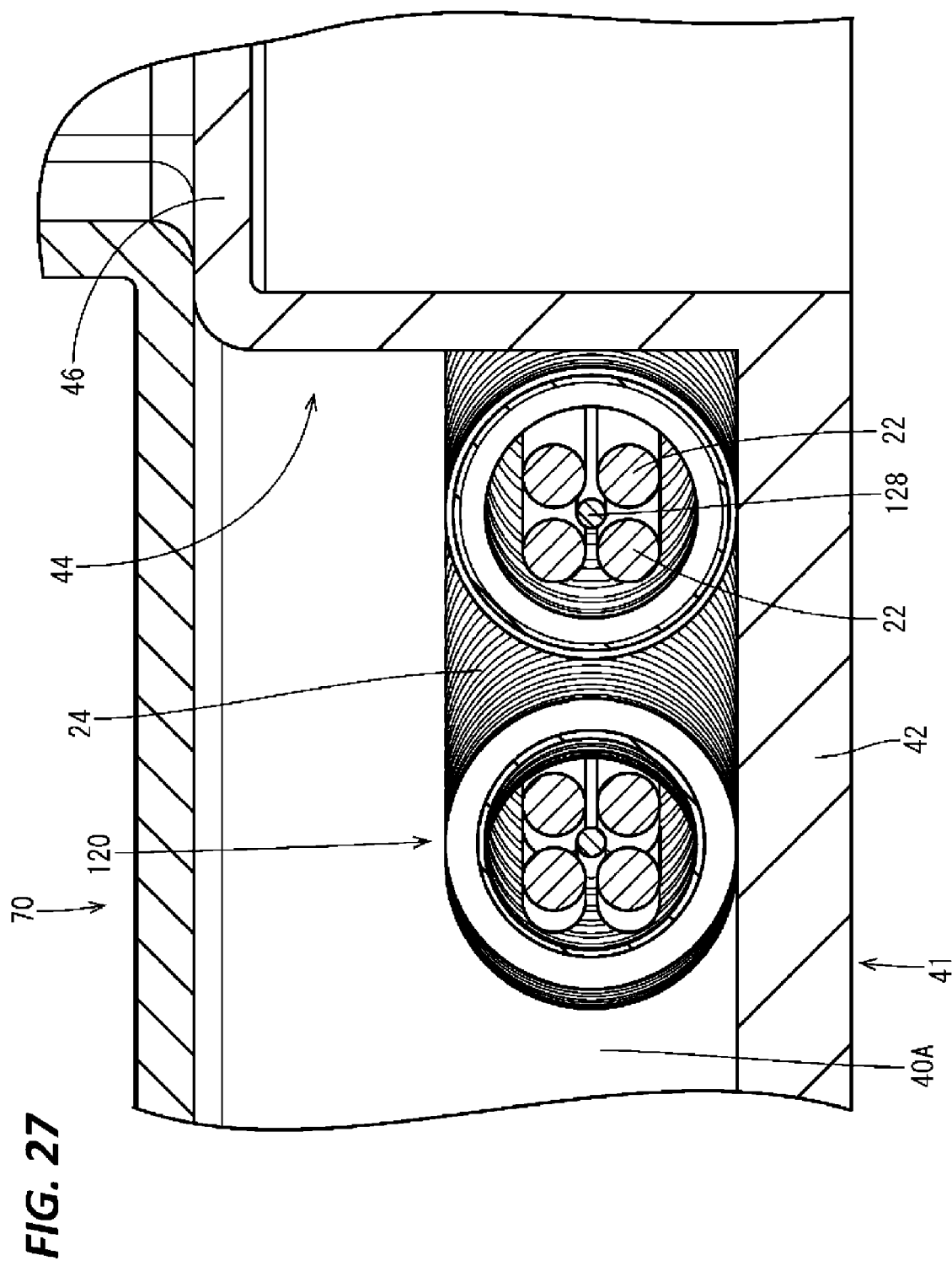
FIG. 27 is an enlarged cross-sectional view of an important part of FIG. 26.

As shown in FIGS. 26 and 27, in a wire harness 120 in a wire harness routing apparatus 110 of the second embodiment, an elastic wire material 128 is inserted together with the multiple wires 22 through the outer covering body 24 of the first embodiment, and since the configurations, operations, and effects that are in common with those of the first embodiment are redundant, description thereof will be omitted. Also, configurations that are the same as those of the first embodiment use the same reference numerals thereas.

The elastic wire material 128 of the second embodiment is a wire material that has rigidity according to which deformation can be performed in an arc shape, and for example, is made of piano wire, or the like. Also, the elastic wire material 128 is configured to be slightly longer than the entire length of the outer covering body 24, and when the elastic wire material 128 is inserted into the outer covering body 24, the elastic wire material 128 is exposed from the seat-side end portion 20B of the outer covering body 24.

Accordingly, the outer covering body 24 of the wire harness 120 of the present embodiment loosely curves due to the reaction force that causes the elastic wire material 128 inserted therein to return to normal.

Figure 28:
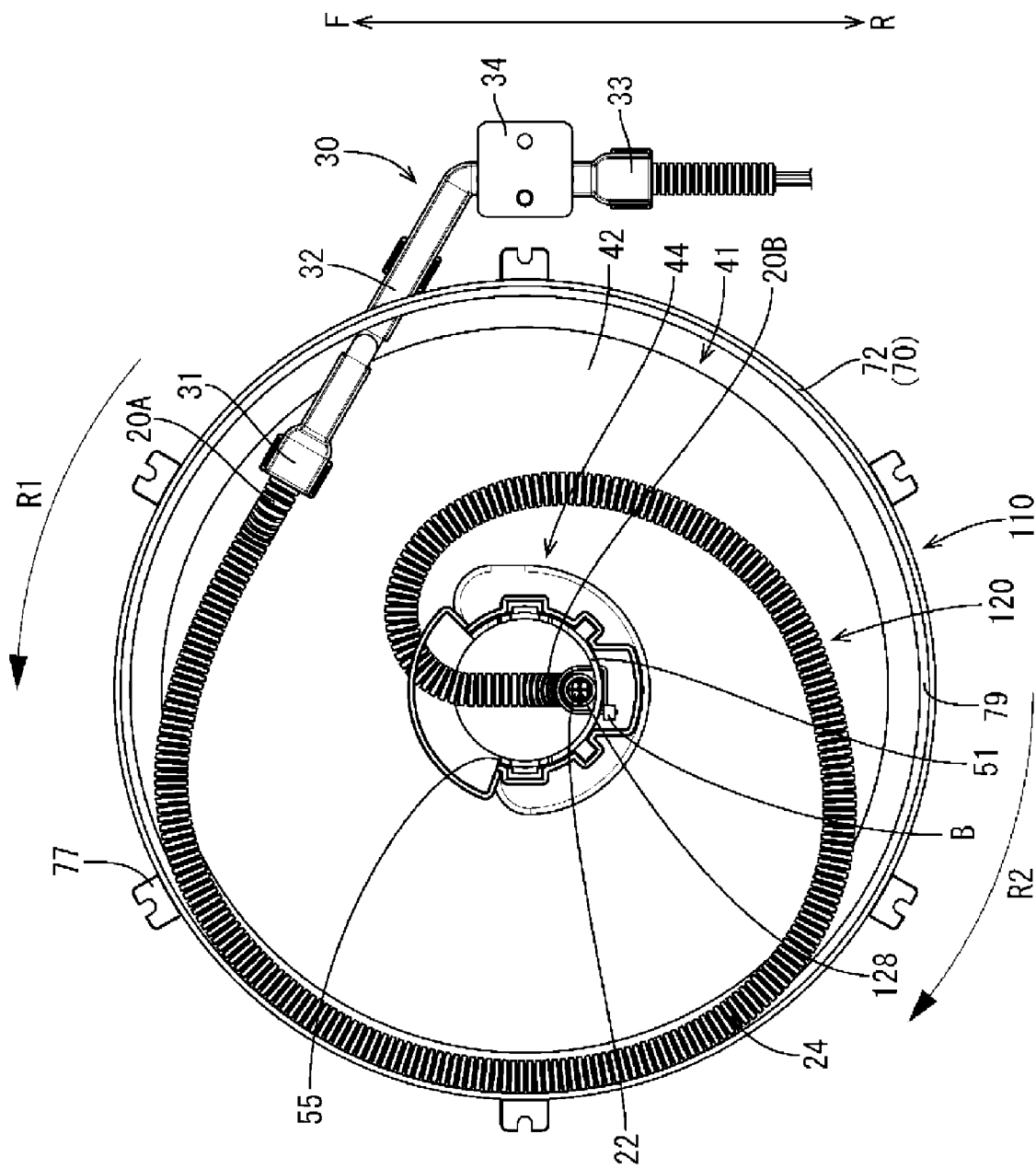
FIG. 28 is a plan view corresponding to FIG. 17 of a second embodiment.

Specifically, when the case 40 reaches a frontward-facing state shown in FIG. 28, the wire harness 20 is arranged so as to be pulled out obliquely rightward and frontward from the seat-side fixing portion 44, thereafter be folded over rearward, and thereafter loosely surround the seat-side fixing portion 44 once. Here, since the elastic wire material 128 is inserted into the outer covering body 24 in the wire harness 120 of the present embodiment and the wire harness 120 is loosely curved in the accommodation portion 40A of the case 40, the outer covering body 24 is arranged so as to approximately surround the seat-side fixing portion 44 once so as to extend along the circular side wall 72 of the upper case 70.

Figure 29:
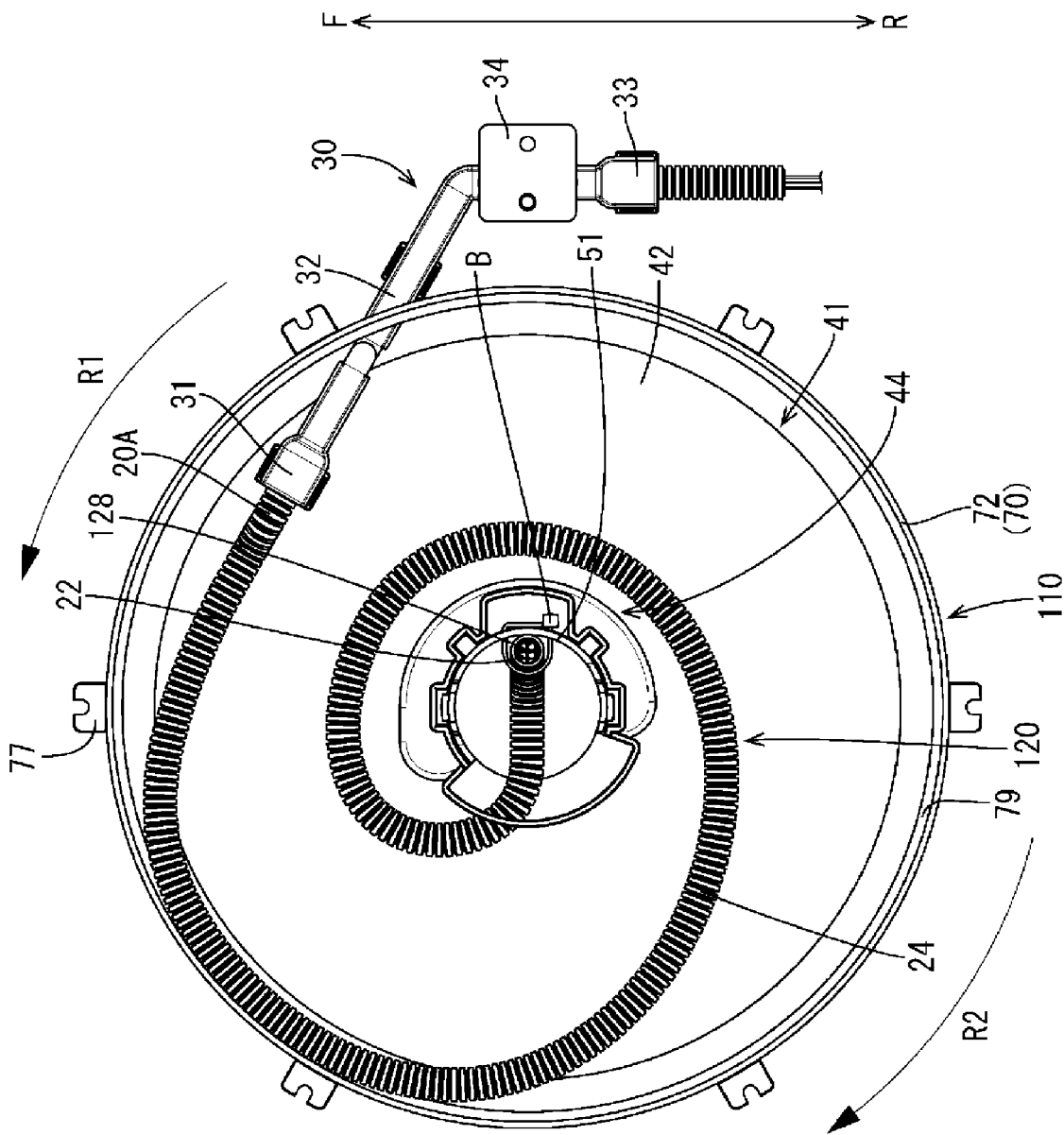
FIG. 29 is a plan view corresponding to FIG. 21 of the second embodiment.

Also, when the case 40 is rotated leftward R1, which is counterclockwise, together with the seat S from the frontward-facing state shown in FIG. 28 and the case 40 reaches the leftward-facing state from the frontward-facing state as shown in FIG. 29, the wire harness 20 is wrapped around the seat-side fixing portion 44. Also, the wire harness 20 is pulled out leftward from the seat-side fixing portion 44, is thereafter folded over frontward, is thereafter loosely arranged halfway surrounding the seat-side fixing portion 44, and thereafter the outer covering body 24 is arranged so as to extend along the circular side wall 72 of the upper case 70.

As described above, according to the wire harness 120 of the present embodiment, the wire harness 20 is loosely curved in the accommodation portion 40A of the case 40 due to the elastic wire material 128, and therefore it is possible to prevent a case in which the rotation of the case 40 is hampered due to the wire harness 120 being tangled in the accommodation portion 40A of the case 40.

Third Embodiment

Next, a third embodiment will be described with reference to FIGS. 30 to 32.

A wire harness 220 of a wire harness routing apparatus 210 of the third embodiment is obtained by modifying the shape of the outer covering body 24 of the first embodiment, and configurations, operations, and effects that are in common with those of the first embodiment are redundant, and therefore description thereof will be omitted. Also, configurations that are the same as those of the first embodiment use the same reference numerals thereas.

An outer covering body 224 of the wire harness 220 of the third embodiment is made of an insulating synthetic resin, and can be bent in only one direction with the multiple wires 22 inserted therein.

Figure 30:
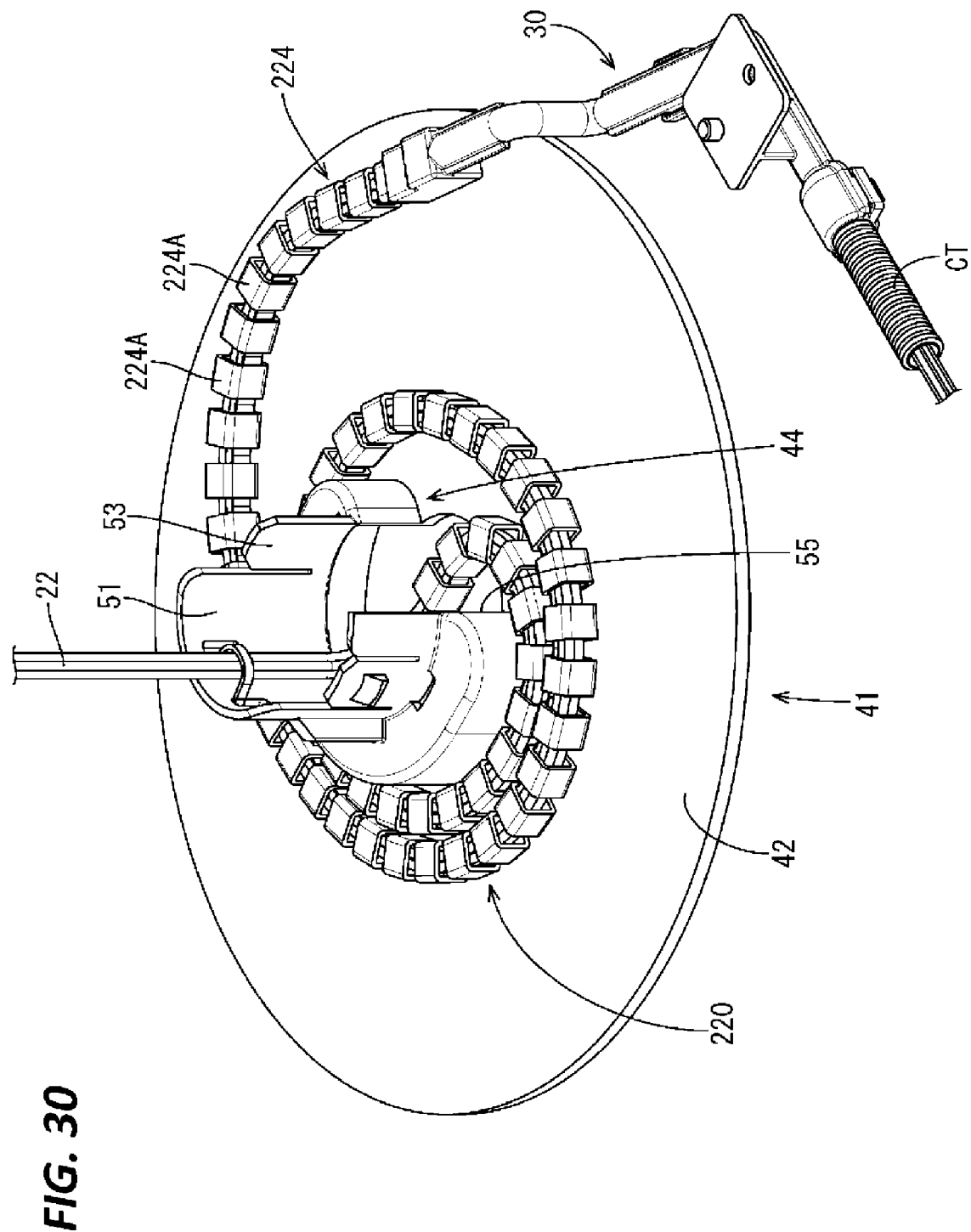
FIG. 30 is a perspective view corresponding to FIG. 5 of a third embodiment.
Figure 31:
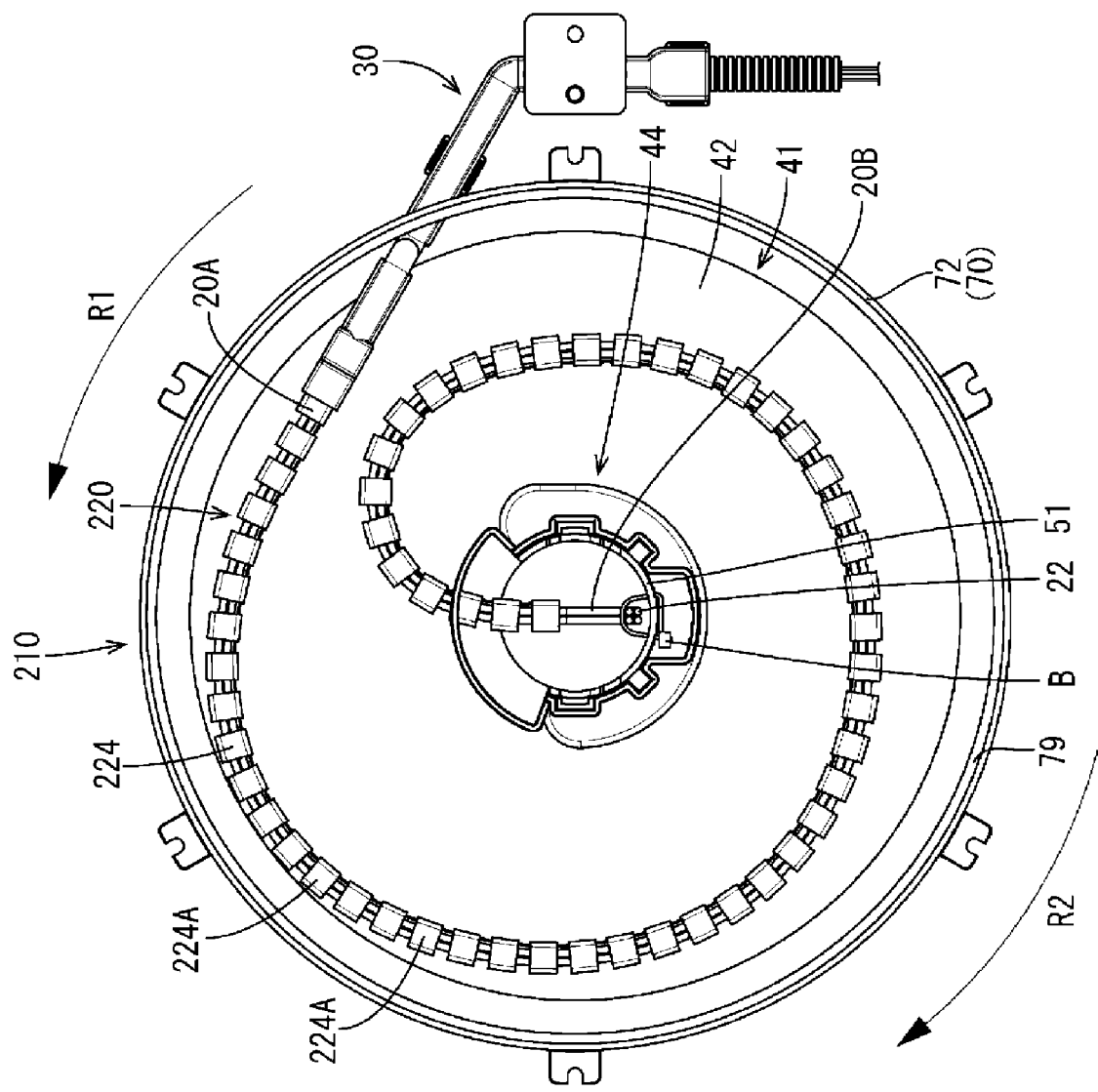
FIG. 31 is a plan view corresponding to FIG. 17 of the third embodiment.
Figure 32:
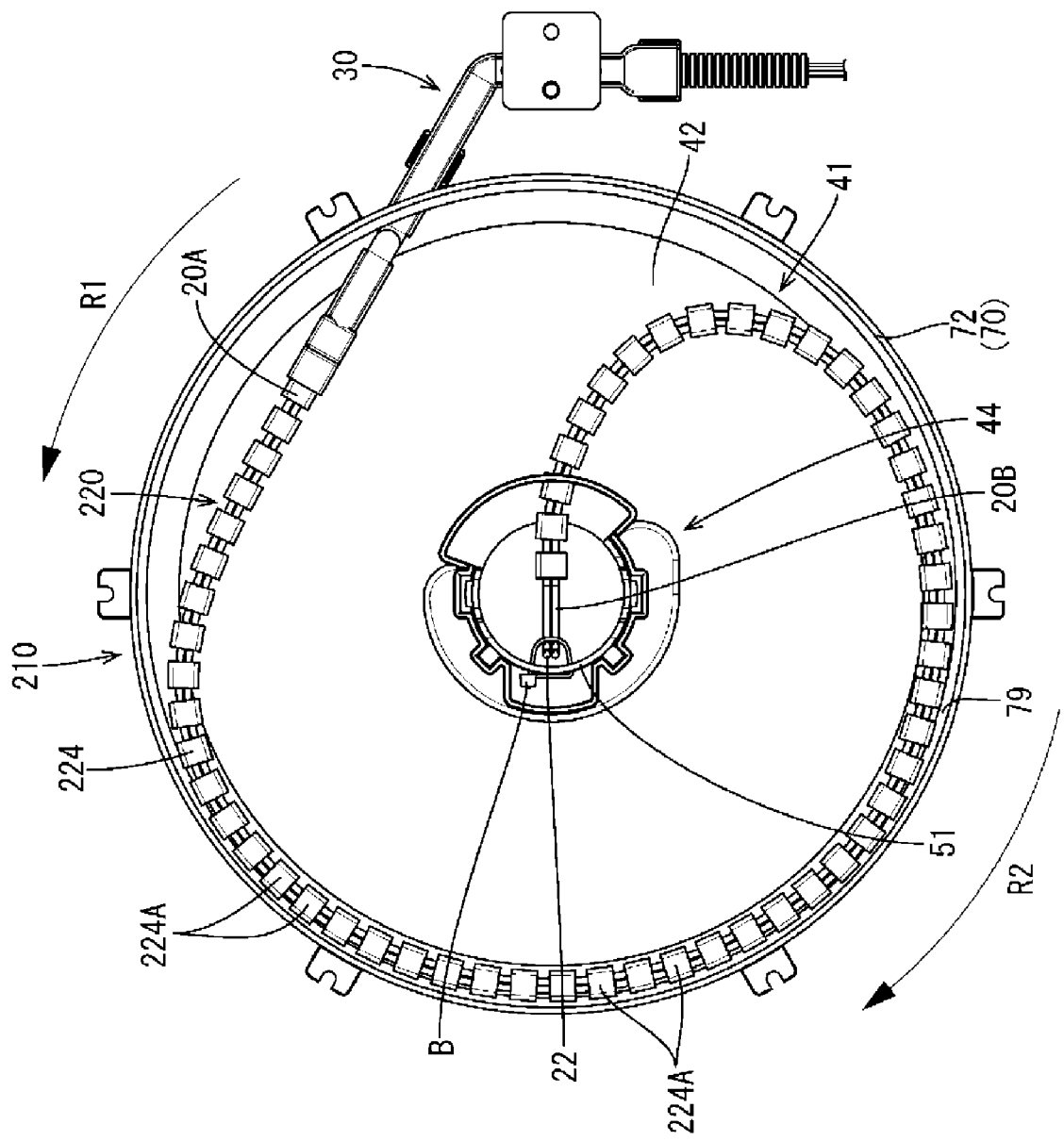
FIG. 32 is a plan view corresponding to FIG. 19 of the third embodiment.

In the present embodiment, as shown in FIGS. 30 to 32, only portions on one side of approximately rectangular square tubes portion 224A are joined in the outer covering body 224, and thus the outer covering body 224 can be bent in only the rightward direction, which is clockwise. That is, the wire harness 20 can be put in the form of a spiral that curves only clockwise from a linear state of extending linearly. Accordingly, the outer covering body 224 of the present embodiment is restricted from being bent in a direction different from the wrapping direction.

Specifically, as shown in FIG. 31, when the case 40 reaches a frontward-facing state from the leftward-facing state, the wire harness 20 is arranged in a clockwise spiral shape so as to be pulled out obliquely rightward and frontward from the seat-side fixing portion 44, thereafter be folded over rearward, and thereafter loosely surround the seat-side fixing portion 44 once.

Also, when the case 40 is rotated rightward R2, which is clockwise, together with the seat S from the frontward-facing state shown in FIG. 31, and the case 40 reaches the rightward-facing state from the frontward-facing state as shown in FIG. 32, the wire harness 20 is arranged so as to be pulled out rightward from the seat-side fixing portion 44, thereafter folded over obliquely leftward and rearward, and thereafter surround the seat-side fixing portion 44 approximately once so as to extend along the later-described circular side wall 72 of the upper case 70.

That is, according to the present embodiment, when the case 40 is rotated rightward, which is clockwise, and the wrapped wire harness 220 is unwrapped, it is possible to restrict the outer covering body 224 from bending in a direction (leftward direction) that is different from the wrapping direction. Accordingly, it is possible to prevent the wire harness 220 from being tangled and the rotation of the case 40 being hindered due to the outer covering body 224 bending in an unintended direction in the case 40.

Other Embodiments

The technique disclosed in the present specification is not limited to the embodiments described in the above description and the drawings, but for example, various aspects such as the following are also encompassed therein.

(1) In the above-described embodiment, a configuration was used in which the case 40 rotates 360 degrees together with the seat S. However, there is no limitation to this, and it is also possible to use a configuration in which the rotation range of the case is made less than 360 degrees.

(2) A configuration was used in which the seat-side pedestal 84 is rotatably supported on the inner side of the base-side pedestal 82. However, there is no limitation to this, and it is also possible to use a configuration in which the seat-side pedestal is rotatably supported on the outer side of the base-side pedestal 82, and the case is arranged on the inner side in the radial direction of the base-side pedestal.

(3) In the above-described embodiment, a configuration was used in which the case 40 is formed into a circular shape so as to extend along the inner peripheral surface of the seat-side pedestal 84. However, there is no limitation to this, and the case may also be formed into a circular shape or a small circular shape, as long as it is arranged on the inner side in the radial direction of the seat-side pedestal.

(4) In the above-described embodiment, a configuration was used in which the wire harness 20 is wrapped clockwise. However, there is no limitation to this, and a configuration may also be used in which the wire harness is wrapped counterclockwise.

LIST OF REFERENCE NUMERALS

10, 110, 210 Wire harness routing apparatus
20, 120, 220 Wire harness 22 Wire
24, 124, 224 Outer covering body
40 Case
30 Base-side fixing member
44 Seat-side fixing portion
49 Overhang portion
82 Base-side pedestal
84 Seat-side pedestal
80 Rotation platform (example of "rotation mechanism")
90 Base portion
128 Elastic wire material
S Seat

What is claimed is:

1. A wire harness routing apparatus configured to be attached to a rotation mechanism that allows a seat to be rotated with respect to a base portion provided in a vehicle, the wire harness routing apparatus comprising:
   a wire harness that is arranged between the seat and the base portion; and
   a case configured to rotate accompanying rotation of the seat in a state of accommodating the wire harness,
   wherein the rotation mechanism includes a ring-shaped base-side pedestal that is fixed to the base portion, and a ring-shaped seat-side pedestal that is smaller than the base-side pedestal, is fixed to the seat, and allows the seat to be rotated due to being rotatably attached to an inner side of the base-side pedestal, and
   the case is arranged on an inner side in a radial direction of the seat-side pedestal using a rotational axis of the rotation mechanism as a reference.

2. The wire harness routing apparatus according to claim 1, wherein the case is formed into a circular shape so as to extend along an inner peripheral surface of the seat-side pedestal.

3. The wire harness routing apparatus according to claim 2, comprising
   a base-side fixing member that is fixed to the base portion in a state of holding an end portion on the base portion side of the wire harness pulled out from the case toward the base portion, and that is configured to rotate relative to the case accompanying rotation of the seat,
   wherein the case includes a gap that is formed along a side wall of the case, and through which the base-side fixing member is inserted, and
   a side wall of the case is provided with a harness reception portion that is provided protruding inward in a radial direction and receives the wire harness when the wire harness is arranged along the side wall.

4. The wire harness routing apparatus according to claim 1, comprising
   a base-side fixing member that is fixed to the base portion in a state of holding an end portion on the base portion side of the wire harness pulled out from the case toward the base portion, and that is configured to rotate relative to the case accompanying rotation of the seat,
   wherein the case includes a seat-side fixing portion that fixes an end portion on the seat side of the wire harness to a vicinity of a rotational center of the case, and
   the wire harness from the base-side fixing member to the seat-side fixing portion is wrapped by the seat-side fixing portion due to the case being rotated in one direction, and the wrapped wire harness is unwrapped and surrounds the seat-side fixing portion once due to the case being rotated in another direction, which is a direction opposite to the one direction.

5. The wire harness routing apparatus according to claim 4, wherein the seat-side fixing portion includes a rounded overhang portion at which the wire harness is arranged loosely along a wrapping center side of the wire harness when the wire harness is wrapped.

6. The wire harness routing apparatus according to claim 3, wherein the wire harness is constituted by including an outer covering body that can elastically deform, a wire that is inserted through the outer covering body, and an elastic wire material that is inserted through the outer covering body together with the wire and causes the outer covering body to loosely curve.

7. The wire harness routing apparatus according to claim 3, wherein the wire harness is constituted by including an outer covering body that restricts bending in a direction different from a wrapping direction, and a wire that is inserted through the outer covering body and moves in the case together with the outer covering body.

* * * * *